(12) United States Patent
Kai et al.

(10) Patent No.: US 8,058,842 B2
(45) Date of Patent: Nov. 15, 2011

(54) CELL CONTROLLER, BATTERY MODULE AND POWER SUPPLY SYSTEM

(75) Inventors: Tsuyoshi Kai, Fukaya (JP); Tunemi Aiba, Kiryu (JP); Akihiko Kudo, Hitachinaka (JP); Yoshinori Aoshima, Tukubamirai (JP); Akihiko Emori, Hitachi (JP)

(73) Assignee: Hitachi Vehicle Energy, Ltd (JP)

( * ) Notice: Subject to any disclaimer, the term of this patent is extended or adjusted under 35 U.S.C. 154(b) by 1141 days.

(21) Appl. No.: 11/830,152

(22) Filed: Jul. 30, 2007

(65) Prior Publication Data

US 2008/0050645 A1 Feb. 28, 2008

(30) Foreign Application Priority Data

Jul. 31, 2006 (JP) .................. 2006-208375

(51) Int. Cl.
*H02J 7/00* (2006.01)
*H02J 7/04* (2006.01)
(52) U.S. Cl. ....................... 320/116; 320/152
(58) Field of Classification Search .................. 320/116, 320/152
See application file for complete search history.

(56) References Cited

U.S. PATENT DOCUMENTS

| 7,471,065 B2 * | 12/2008 | Emori et al. ............... 320/116 |
| 7,579,842 B2 * | 8/2009 | Hunter et al. ............... 324/426 |
| 2007/0018613 A1 * | 1/2007 | Miyazaki et al. .......... 320/116 |

FOREIGN PATENT DOCUMENTS

| JP | 03-255552 | 11/1991 |
| JP | 10-270006 | 9/1998 |
| JP | 2000-228178 | 8/2000 |
| JP | 2001-190030 | 7/2001 |
| JP | 2003-070179 | 7/2003 |
| JP | 2004-273351 | 9/2004 |
| JP | 2007-287416 | 11/2007 |

OTHER PUBLICATIONS

Office Action (including English translation) for Japanese Patent Application No. 2006-208375, mailed Jul. 22, 2008.
Office Action (including English translation) for Japanese Patent Application No. 2006-208375, mailed Mar. 31, 2009.

* cited by examiner

*Primary Examiner* — M'Baye Diao
(74) *Attorney, Agent, or Firm* — Jason H. Vick; Sheridan Ross P.C.

(57) ABSTRACT

A cell controller having excellent productivity is provided. A cell-con 80 has 12 ICs IC-1 to IC-12 mounted on a substrate, and these ICs detect voltages of respective cells constituting a cell pack, perform capacity adjustment on the respective cells, and are mounted two by two on rectangular longer sides of a rectangular continuous straight line L-L' defined on a substrate from the IC-1 on a highest potential side to the IC-12 on a lowest potential side continuously in order of potential differences of the corresponding cell packs. Distances between the rectangular shorter sides of the rectangular continuous straight line L-L' are the same. On the cell-con 80, between the IC-1 to IC-12 having different ground voltages, each of the ICs has signal output terminals connected to signal input terminals of a lower order IC respectively in an electrically non-insulated state.

8 Claims, 13 Drawing Sheets

US 8,058,842 B2

CELL CONTROLLER, BATTERY MODULE AND POWER SUPPLY SYSTEM

FIELD OF THE INVENTION

The present invention relates to a cell controller, a battery module and a power supply system, and more particularly relates to a cell controller for a battery unit in which a plurality of cells are connected in series, a battery module including the cell controller, and a power supply system including the battery module.

DESCRIPTION OF THE RELATED ART

Conventionally, for example, as a power supply for charging/discharging large current for a hybrid electric vehicle (HEV) which is driven by an engine and a motor or an electric vehicle such as a pure electric vehicle (PEV) which is driven only by a motor, it has been used a battery module including cell groups (cell packs) each having a plurality of cells such as nickel hydride secondary cells, lithium secondary cells, or the like connected in series or parallel.

In order to grasp cell states of respective cells, voltages of the individual cells constituting the battery module are detected. Thus, the control circuit thereof becomes complicated as the number of cells increases, and the connection operation and the assembly operation thereof become complicated. Note that there is disclosed a technique to construct a battery module by connecting a large number of cells (Japanese Patent Application Laid-open No. H10-270006). Also, there is disclosed a technique to detect voltages of individual cells (Japanese Patent Application Laid-open No. 2003-70179).

SUMMARY OF THE INVENTION

An object of the present invention is to provide a cell controller, a battery module or a power supply system which is excellent in productivity such as assembly performance. Further, with embodiments which will be described below, various problems besides the above-described object can be solved, and these problems and means for solving them will be described in the embodiments.

Cell groups as targets of control by a cell controller to which the present invention is applied, or cell groups constituting a battery module or a power supply system to which the present invention is applied each have a plurality of cells connected in series. State (voltages for example) of cells in a cell group are detected by detecting circuits, and the detecting circuits are provided in an integrated circuit (hereinafter, referred to as IC). A plurality of ICs are disposed on a substrate, and the ICs are connected electrically to the cell groups so that the ICs detect states of the respective cells in the cell groups in a divided manner. On the substrate, the ICs are disposed with each other in a positional relationship correlated to the serial connection relationship of the cells as targets of detecting states.

According to the present invention, productivity of the cell controller, the battery module or the power supply system improves.

DETAILED DESCRIPTION OF THE PREFERRED EMBODIMENTS

Figure 1:
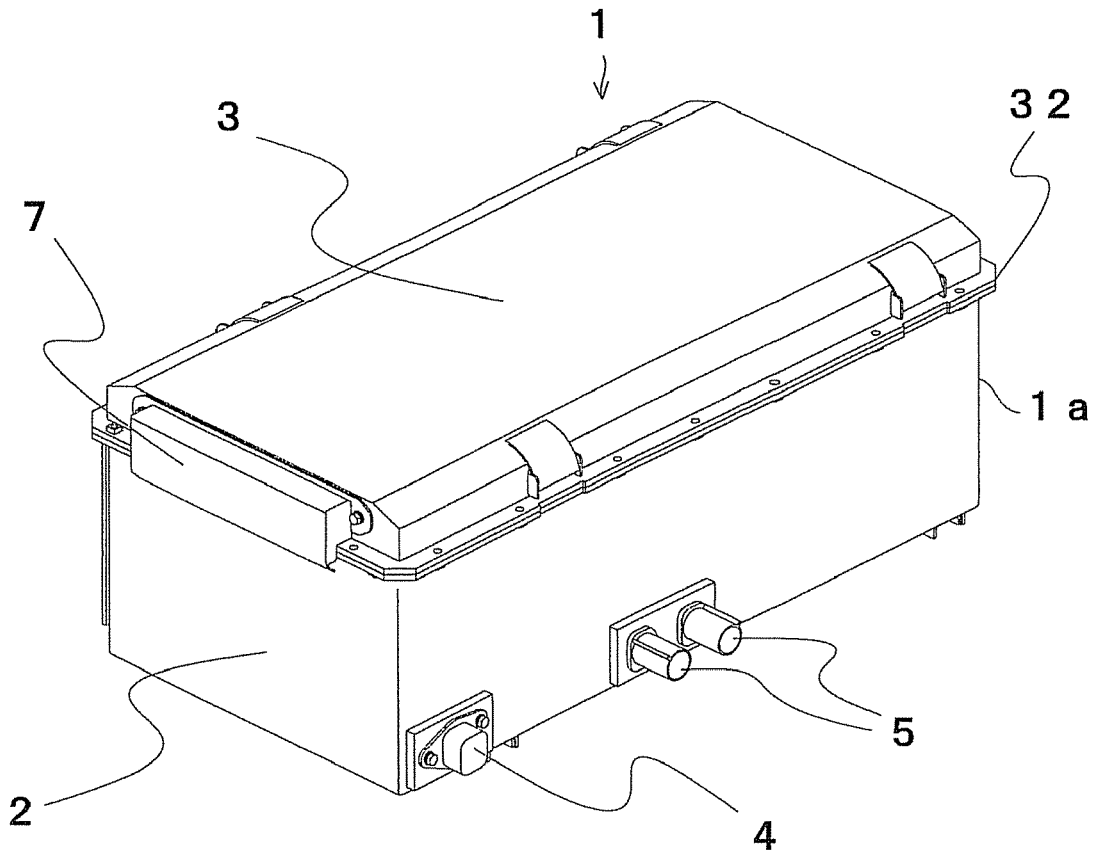
FIG. 1 is an exterior perspective view of a power supply system of an embodiment to which the present invention is applicable.

Hereinafter, embodiments of applying the present invention to a power supply system for a hybrid truck will be described with reference to the drawings. The following embodiments are optimum particularly for a power supply system for a hybrid truck, but also when being applied to a vehicle other than a truck, these embodiments have certain effects which have not been present hitherto. The embodiments can also be applied to a structure to run a vehicle only by torque of a rotary electric machine instead of hybrid drive, in other words, instead of a structure to run a vehicle directly by torque of an engine.

Note that the present invention has the above-described effect of improving productivity, but has further more characteristics and effects in the embodiments described below. A part thereof is described as follows before the description based on the drawings.

A first aspect of the present invention has following characteristics, and hence has an effect to reduce costs for an apparatus or make the apparatus compact. In a cell controller for a battery unit in which a plurality of cell groups are connected in series, each cell group having a plurality of cells connected in series, ICs for detecting voltages of respective cells constituting the cell groups are mounted on a substrate corresponding to the number of cell groups, and the ICs are positioned and arranged in order from an IC on a highest potential side to an IC on a lowest potential side or in order from an IC on a lowest potential side to an IC on a highest potential side in order of potentials of the corresponding cell groups.

The first aspect has the following means, and hence has an effect to reduce costs for an apparatus or make the apparatus compact. It is preferable that the number of ICs mounted on the rectangular longer sides of the rectangular continuous straight line is the same in each of the rectangular longer sides, and it is further preferable that distances between the rectangular shorter sides of the rectangular continuous straight line are the same. Also, it is preferable that between each of the ICs and a lower order IC thereof, terminals related to input and output of a signal are connected in an electrically non-insulated state. Further, capacity adjusting circuits each constituted of a resistor element and a switch element for adjusting capacities of the respective cells constituting the cell groups may be mounted on the substrate, and the resistor elements may be mounted collectively in a region separated in distance from the rectangular continuous straight line. Also, photo couplers may be further mounted on the substrate for performing signal communication in an electrically insulated state between input terminals of the IC on the highest potential side and output terminals of the IC on the lowest potential side and a higher order battery controller controlling the cell controller. Further, on at least one of the cell groups, a temperature sensor may be arranged for detecting a temperature of one of the cells constituting the cell groups, and the substrate may relay led-out lines lead out from the temperature sensor to the higher order battery controller controlling the cell controller. Then, it is desirable that the ICs are supplied with operational power from the corresponding cell groups.

A second aspect of the present invention has following structures, and hence has an effect to reduce costs for an apparatus or make the apparatus compact. A battery module of the second aspect includes a battery unit in which a plurality of cell groups are connected in series, each cell group having a plurality of cells connected in series, and a cell controller according to the first aspect.

Also, in the second aspect, the cells each have an end face and a side face, and have electrodes on the end face, and by fixing the plurality of cells so that side faces of the respective cells oppose each other, a cell pack is constructed. Further, a plurality of cell packs are disposed so that side faces of the cells constituting the respective cell packs oppose each other. Further, the substrate including ICs is disposed so as to oppose the side faces of the cells. With such a structure, the battery module becomes compact, and assembly workability improves. Further, complexity in electrical wiring for each cell is eliminated, and thereby electrical reliability improves. Also, productivity of electrical connection operation improves.

In the second aspect of the present invention, it is possible to provide a battery module having high volume capacity density at low costs by the following improvements. It is preferable that the cells are lithium secondary cells having amorphous carbon materials as negative electrode active materials, and the cells have lithium manganese complex oxides as positive electrode active materials.

A third aspect of the present invention has following structures, and hence has an effect to reduce costs for a system or make the system compact. A power supply system of the third aspect includes a high voltage battery having at least one battery module according to the second aspect, and a battery controller which communicates with the cell controller in an electrically insulated state, and calculates from received voltages of all cells, which constitute the high voltage battery, cell states of all the cells.

In the above-described third aspect, the high voltage batteries may have a plurality of the battery modules, and the battery modules may be connected in series via a switch for maintenance and inspection. Also, the battery controller may be supplied with operational power from an external power supply. In this case, the external power supply may be a lead battery mounted in a vehicle. Further, the power supply system may further include a voltage converter converting a voltage of the external power supply. At this time, it is preferable that capacitors are interposed between positive and negative electrodes of the high voltage battery and a ground respectively, and the ground has a same potential as a minus side of the power supply whose voltage is converted by the voltage converter.

Also, in the above-described third aspect, it is preferable that the battery controller and the voltage converter are connected by a signal line for sending a supply stop instruction for the converted voltage from the battery controller side to the voltage converter side. Further, the power supply system may further include a fan operated by the external power supply for cooling all the cells constituting the high voltage battery, and a relay, in which the battery controller may control operation of the fan by on/off controlling the relay.

Then, in the third aspect, it is preferable that positive and negative electrodes of the high voltage battery are lead out to the outside via relays respectively. At this time, the relays may be each on/off controlled from an external apparatus to which the high voltage battery supplies power. Also, to a relay inserted in the positive electrode of the high voltage battery, a relay having a current resistance value smaller than that of the relay may be connected in parallel via a resistor, and the relay connected in parallel may be on/off controlled from the external apparatus at an initial time when the battery module supplies power to the external apparatus. Further, the battery controller may have a total voltage detecting circuit for taking in a total voltage of the high voltage battery in an electrically insulated state.

(Structure)

Figure 15:
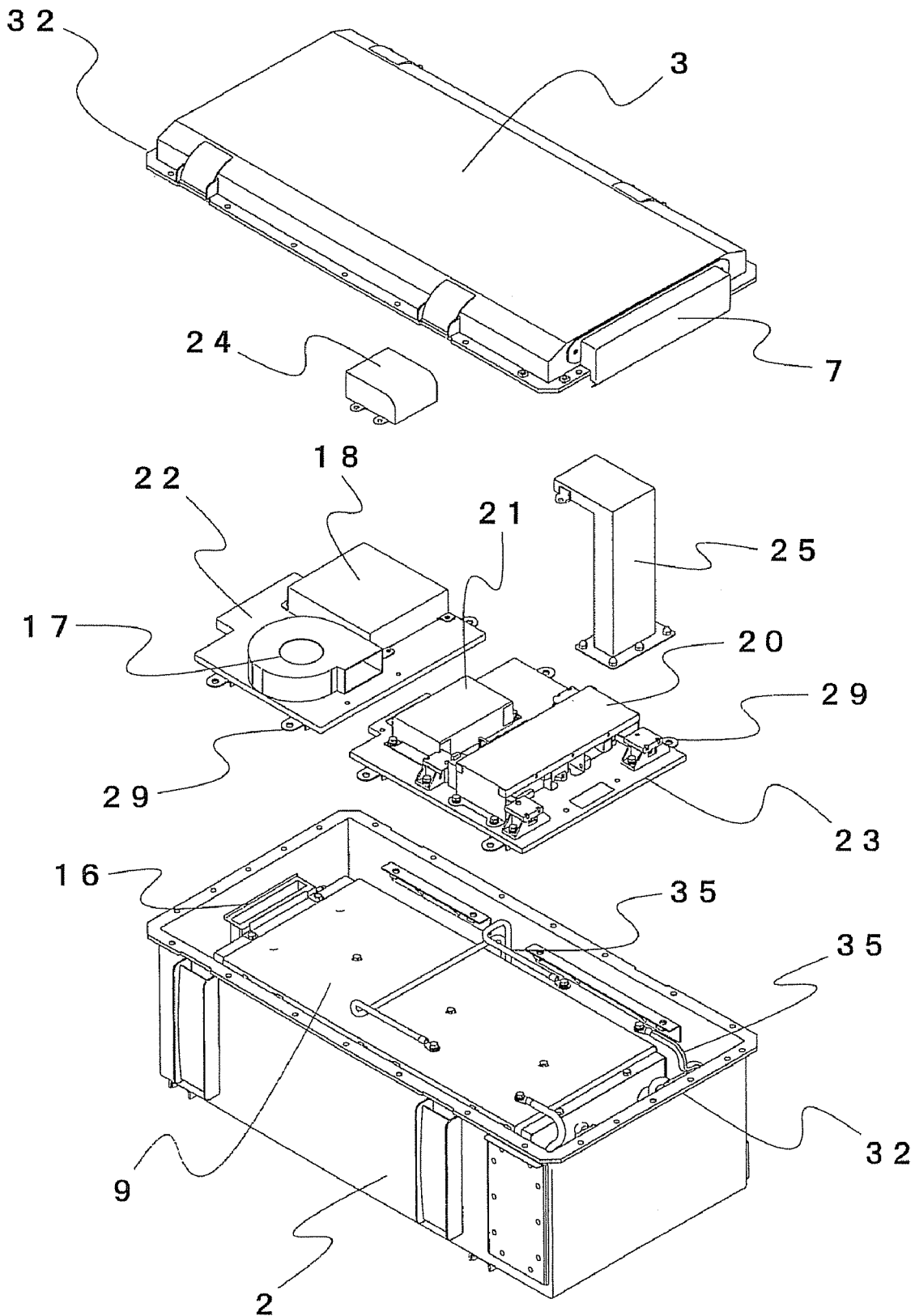
FIG. 15 is an exploded perspective view of the power supply system showing a state that the power supply module is accommodated in the lower container of the external box during assembly of the power supply system.

As shown in FIG. 1 and FIG. 15, a power supply system 1 of this embodiment has an external box 1a in a substantially rectangular parallelepiped shape. The external box 1a is constituted of a lower container 2 accommodating two battery modules 9 constituting a high voltage battery, a blower fan 17, ventilation ducts, a high voltage circuit, a low voltage circuit and cables, and an upper cover 3 enclosing an upper opening of the lower container 2. On the lower container 2, a cable connector 4 for connecting a cable or the like for communication with a higher controller (refer to the reference numeral 110 in FIG. 17) on a vehicle side to control the entire hybrid truck and two output plugs 5 are provided to project respectively on a lower part of one side face along a longitudinal direction of the external box 1a. In the upper cover 3, an inlet (refer to the reference numeral 8 in FIG. 13) for taking cooling air (outside air) into the external box 1a is formed in an end face on one side in the longitudinal direction, and an outside of the inlet is covered by a filter guard 7. Flanges 32 are formed on outer edge portions of the lower container 2 and the upper cover 3 respectively, and screw holes for fastening with screws are formed in the flanges 32.

This structure forms a structure to contain the blower fan 17 and the ventilation ducts on the outside of the battery module 9. This structure enables to perform a step of separately producing the battery module 9, which is an important part for the power supply system, and the blower fan 17, the ventilation duct and so on and a step of assembling them thereafter, and hence the productivity improves. Also, reliability of an apparatus improves. Further, against mechanical shock from the outside, cells which will be described below are protected by the lower container 2 and the upper cover 3 which cover the outside of the battery modules 9, in addition to the protection by cases of the battery modules 9, and thus high safety can be maintained. For a vehicle mounted product, consideration for traffic accident is desirable. In an apparatus which will be described below, safety when being mounted in a vehicle is considered sufficiently. Also, there is no fear that the high voltage systems of the battery modules 9 become exposed during an accident, so that safety related to a high voltage can be maintained.

The blower fan 17, the ventilation duct, and so on are arranged in a concentrated manner on one of exterior side faces of the battery module 9, which facilitates an assembly operation. Further, the cable connector 4 and the two output plugs 5 are provided respectively on the lower container 2, but they are arranged in a concentrated manner on one of side faces, so that there is no fear of being damaged during an assembly operation of the blower fan 17, the ventilation duct, and so on.

Figure 2:
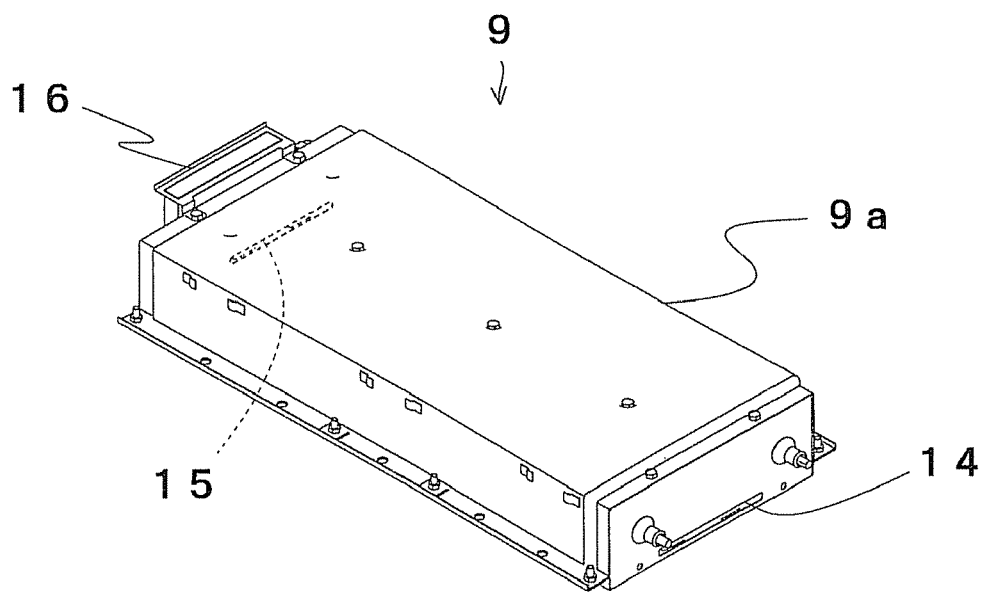
FIG. 2 is an exterior perspective view of a battery module included in the power supply system of the embodiment.
Figure 3:
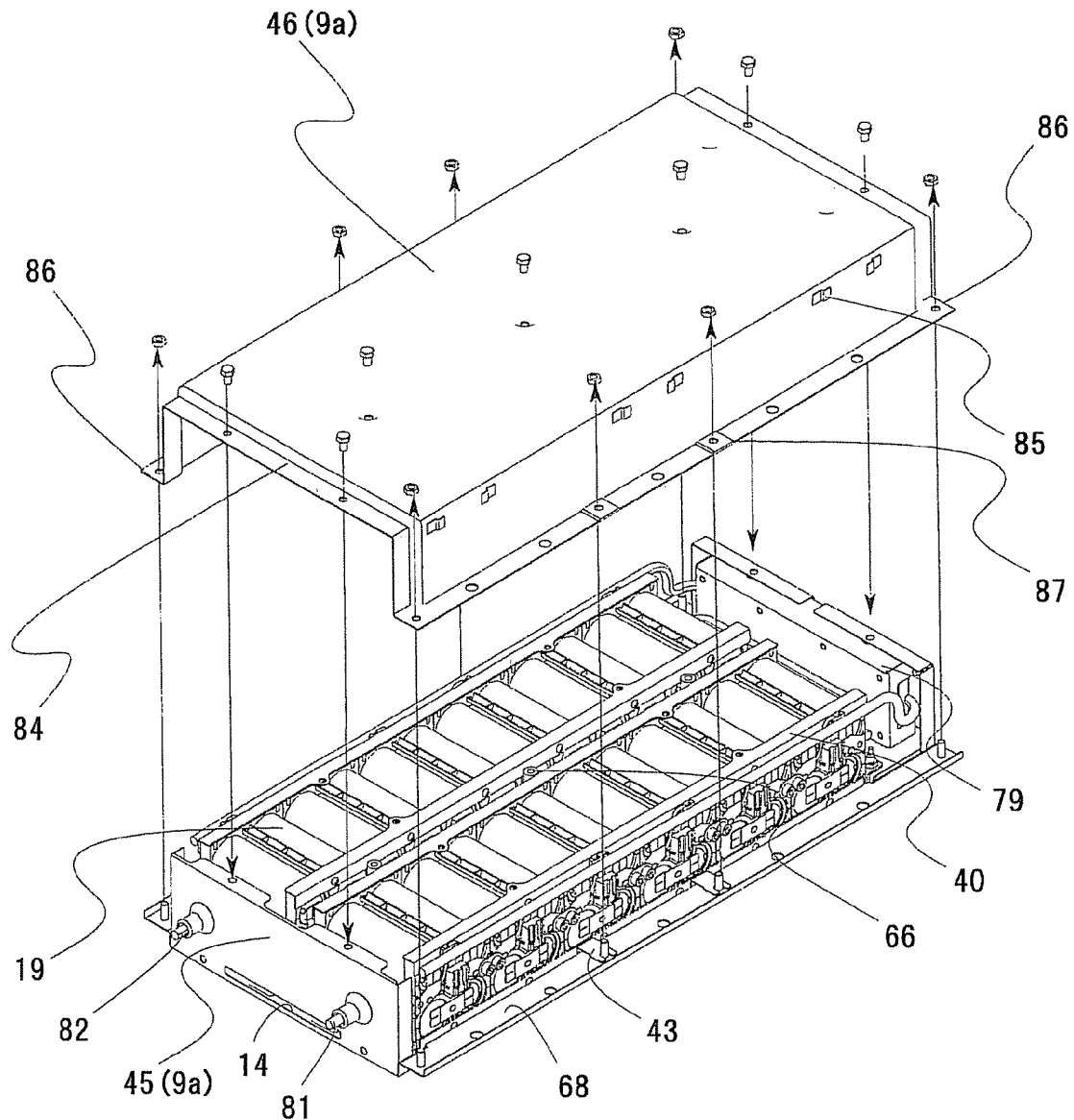
FIG. 3 is a perspective view showing an assembly state of an upper cover of a battery module.

As shown in FIG. 2 and FIG. 3, a battery module 9 has a module case 9a in a substantially rectangular parallelepiped shape, which is made of metal and constituted of an upper cover 46 and a lower cover 45. In the module case 9a, a plurality of cell packs 19 are accommodated and fixed. The battery module 9 is covered by the module case 9a which is a metal case, and in the module case 9a, a large number of wirings for detecting voltage, temperature and so on exist, but they are protected against electrical noise from the outside. Further, as described above, the cells are protected by the module case 9a and the lower container 2 and the upper cover 3 on the outside thereof, and thereby safety of the power supply system will be maintained even when a traffic accident occurs.

<<The Cell Packs>>

Figure 8:
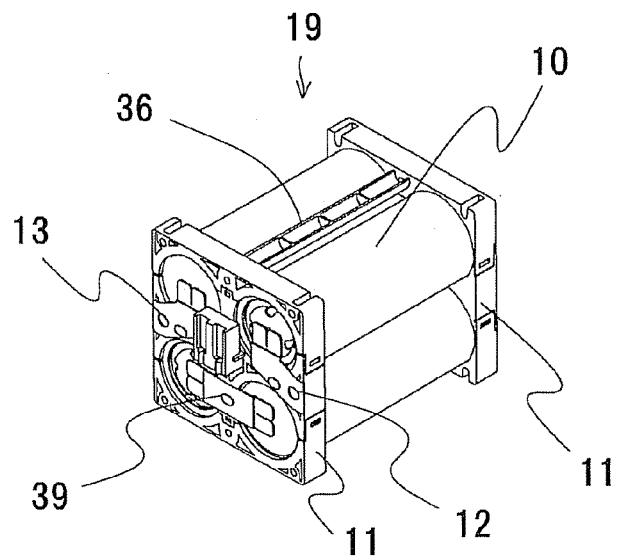
FIG. 8 is an exterior perspective view of the cell pack.
Figure 9:
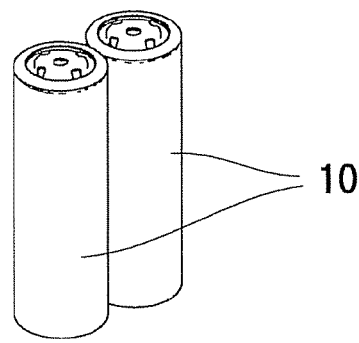
FIG. 9 is an exterior perspective view of cylindrical lithium secondary cells constituting the cell pack.

As shown in FIG. 8, in a cell pack 19, a plurality of (four in this embodiment) cells 10 are arranged in two lines and two rows to have alternating polarities, and the plurality of, preferably four, cells 10 are connected in series. Although there are various types of shapes of cells, cylindrical lithium secondary cells each covered by a casing having high heat conductivity are used in this embodiment as shown in FIG. 9, with positive electrode active material being lithium manganese complex oxide and negative electrode active material being amorphous carbon. These lithium secondary cells have a nominal voltage of 3.6 V and a capacity of 5.5 Ah.

Figure 7:
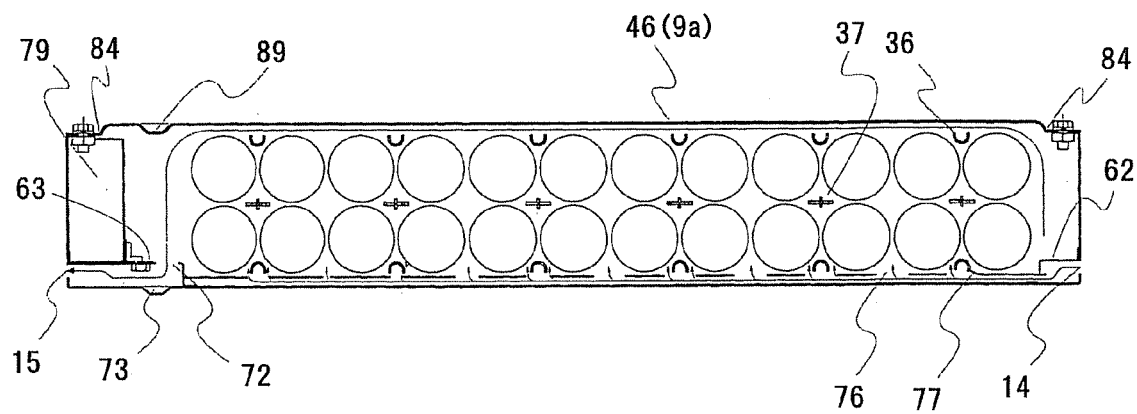
FIG. 7 is a schematic cross-sectional view of the battery module schematically showing distribution paths of cooling air.

In this embodiment, the cells 10 are integrated as the cell packs 19 with a positional relationship such that side faces thereof oppose each other, and these cell packs 19 are fixed inside the module case 9a with an arrangement relationship such that the side faces of the cells oppose each other as shown in FIG. 7. This arrangement relationship is excellent for improving productivity. Moreover, this relationship simplifies the connecting operation of a voltage detection harness 52, a high voltage cable 35, and so on, which will be described below, and thereby the safety can be maintained further.

As shown in FIG. 8, a cell pack 19 is constituted such that two holders 11 constituted of resin moldings having high electrical insulative property sandwich cells 10 in a vertical direction with respect to the circumferential direction of the cells 10, and four cells 10 are connected electrically in series by being spot welded with metal bus bars with each other. Further, to the cell pack 19, voltage detecting lines 58 (refer to FIG. 11) for detecting voltages of the cells 10 and adjusting the voltages are connected. The metal bus bars are gathered on one of the holders 11 (the left side one shown in FIG. 8) via a not-shown flexible substrate constituting the voltage detecting lines 58. For improving workability, the metal bus bars and the not-shown flexible substrate are connected in advance before assembly of the cell pack 19. In other words, a plurality of conducting lines constituting the voltage detecting lines 58 are print-coated on the flexible substrate, with one ends of the conducting lines being connected to the metal bus bars, and the other ends thereof being gathered to a connector. On end faces of the cells 10, electrodes for the cells are provided. By arranging the cells so that the side faces (circumferential faces in this embodiment) of the cells oppose each other, the cell pack is constructed compactly. The electrodes of the cells are arranged regularly in the same direction. Such an arrangement and a structure enable to maintain safety in addition to improvement of workability, and are also favorable in an aspect of maintenance. Shock resistance in a state of being mounted in a vehicle also improves, and the structure is also favorable against mechanical shock in a traffic accident of a vehicle.

At two vertical positions between the holders 11, arch-shape louvers 36 are arranged respectively, which define the distance between the holders 11 and have a U-shape cross section for allowing distribution of cooling air on the outer circumferential face sides of the cells 10. Further, at the center between the holders 11, a cross-shape louver 37 is arranged, which defines the distance between the holders 11 and has a cross-shape cross-section for allowing distribution of cooling air on inner circumferential face sides of the cells 10 (also refer to FIG. 7). Note that a part of the flexible substrate is fixed to the cross-shape louver 37 along a longitudinal direction of the cross-shape louver 37, to the side of the other holder 11 (on the right side shown in FIG. 8) opposite to the one holder 11 to which the connector is fixed. A vehicle in which the power supply system according to this embodiment is mounted will be used under various severe environmental conditions. The above-described structure of distributing the cooling air can suppress increasing of temperature while being used under severe environmental conditions, and is excellent in terms of realizing both size reduction and efficient cooling of an apparatus.

On one of the holders 11, an inter-cell bus bar 39 for connecting the cells 10, a positive electrode bus bar 12 for a positive electrode output, and a negative electrode bus bar 13 for a negative electrode output are insert molded. Further, nuts for fastening by screws are inserted in the positive electrode bus bar 12 and the negative electrode bus bar 13. Also, on the other holder 11, two inter-cell bus bars are insert molded in a direction crossing the inter-cell bus bar 39. Therefore, by spot welding these bus bars and the cells 10, the cell pack 19 in which four cells 10 are connected in series can be constructed. Note that as will be described later, temperature sensors such as thermistors are attached to cells 10 constituting a certain cell pack 19 (refer to the reference numerals TH1 to TH4 in FIG. 11), and from this cell pack 19, conducting lines from the temperature sensor are also led out besides the voltage detecting lines 58 and gathered to the connector thereof. The above-described structure of the cell pack and arrangement relationship of the detecting lines and the led-out lines are excellent in workability, and also excellent for size reduction of an entire apparatus. Also, the cell pack with this structure can be commonly used in other types of power supply systems, which results in improvement of productivity. Further, the structure is also excellent in welding workability for cells, and since electrical connection is made by welding operation, an electrical connection state can be maintained favorably for a long period of time. Therefore, safety and reliability with respect to mechanical vibration and shock are maintained even though high current flows therein.

<<Cell Pack Blocks>>

Figure 4:
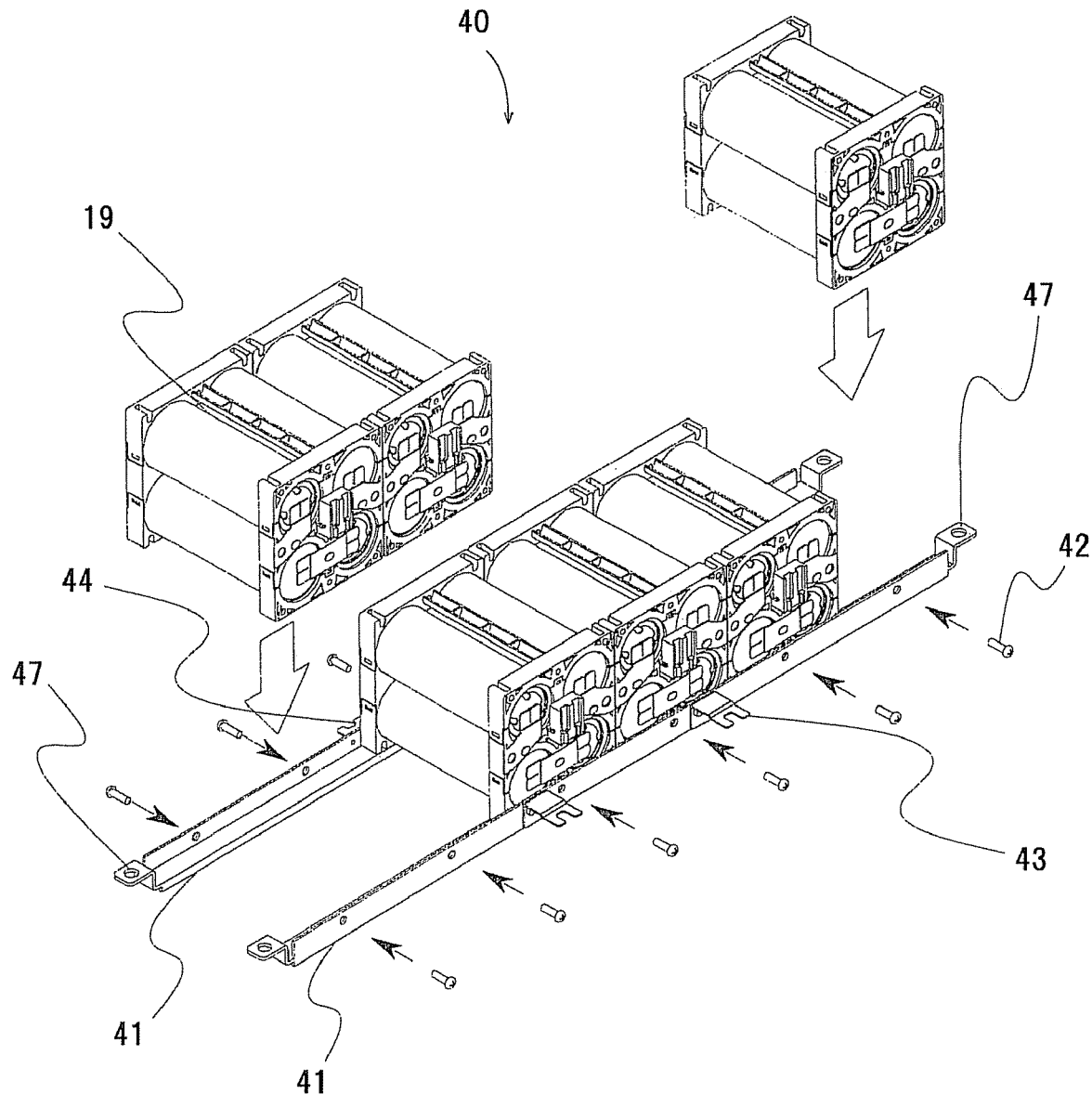
FIG. 4 is a perspective view showing an assembly state of a cell pack block in which cell packs are assembled.
Figure 5:
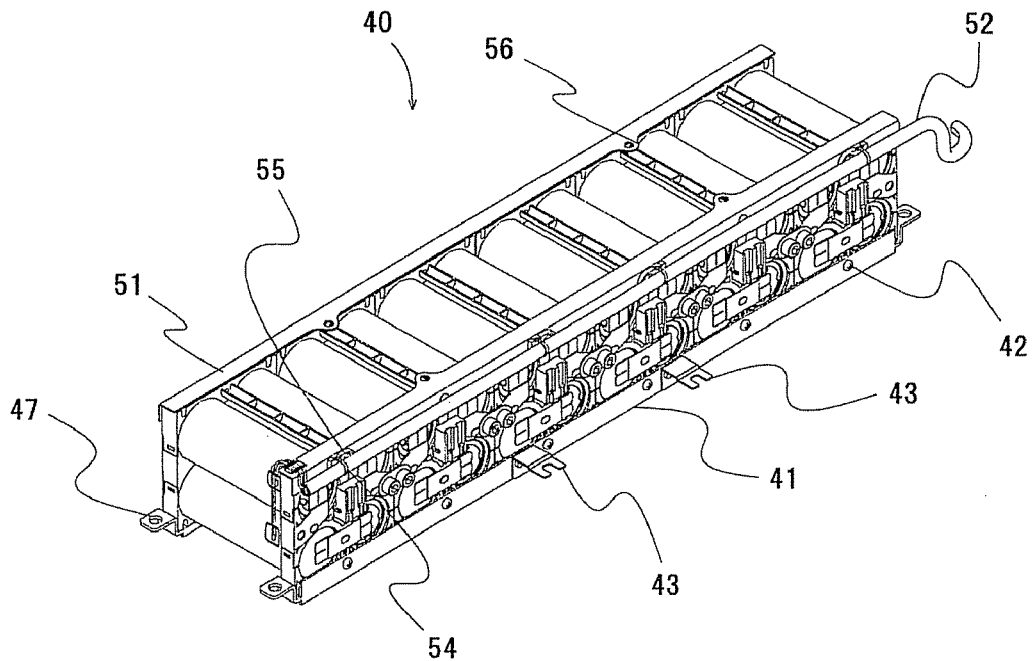
FIG. 5 is an exterior perspective view of the cell pack block.

As shown in FIG. 4 and FIG. 5, in this embodiment, for improving assembly performance and convenience in handling of the battery module 9, a plurality (six in this embodiment) of cell packs 19 are arranged on two channel-shape block bases 41, which each have a substantially h-shape cross-section and are arranged so as to oppose each other, and the cell packs 19 are fixed with tapping screws 42 engaging with fixing holes (female screw parts) formed in the holders 11. Thus a cell pack block 40 is assembled, in which a serial connection is made by inter-cell pack bus bars, which fasten the negative electrode bus bars 13 and the positive electrode bus bars 12 of adjacent cell packs 19 with each other. Therefore, workability for the structure to fix a plurality of cell packs to the block bases 41 in parallel improves. Also, productivity of the cell packs improves, thereby enabling a structure and dimensional relationship in common with cell packs in other power supply systems. The cell pack block is also excellent for detection of cells for quality management and for maintenance after production.

As shown in FIG. 4, the block base 41 has a plurality of flanges projecting from side faces thereof to laterally fix the cell pack block 40 to the lower cover 45. There are two types of these flanges, and for convenience, ones located on the outside of the battery module 9 are referred to as block flanges A43, and ones located on the inside thereof are referred to as block flanges B44. In other words, when it is assumed that a face located on the outside of the battery module 9 is a face to which the connector of the cell pack 19 is fixed, the block flanges A43 are disposed on the block base 41 on this face. The block flanges A43 are sandwiched by the lower cover 45 and the upper cover 46, and the block bases 41 are fastened and fixed simultaneously as fastening of the lower cover 45 and the upper cover 46. Also, on both ends of the block bases 41, block base circular holes 47 are formed for fixing the cell pack block 40 on the lower cover 45 from front and back sides. Such a structure or arrangement is excellent in workability and productivity.

As shown in FIG. 5, on an upper part of the cell pack block 40, block reinforcing plates 51 having a substantially L-shape cross section and a channel shape are arranged in parallel with the block bases 41. The cell packs 19 are fixed laterally to the block reinforcing plates 51 by tapping screws 42. On the block reinforcing plate 51 on the side where the connector is fixed, a voltage detecting harness 52 is fixed, which is connected to the voltage detecting lines 58 (and temperature sensors) of the respective cell packs 19 constituting the cell pack block 40. Specifically, cable ties 55 for attaching tie bands 54 are fixed to one of the block reinforcing plates 51 by the tapping screws 42, and the voltage detecting harness 52 is fixed to the block reinforcing plate 51 by the tie bands 54. Further, the block reinforcing plates 51 have block reinforcing plate curving portions 56 curving at two positions and have circular holes formed therein. Hooks made of wire are inserted in these circular holes for handling, such as carrying the cell pack block 40. With this structure, strength of the cell packs constituted by fixing a plurality of cells increases. Also, mechanical strength is maintained against vibration and shock with respect to the voltage detecting harness 52 connected to the voltage detecting lines 58 of the respective cell packs 19 (and temperature sensors), and further, the structure is excellent in workability for electrical connection.

<<Battery Module>>

Figure 6:
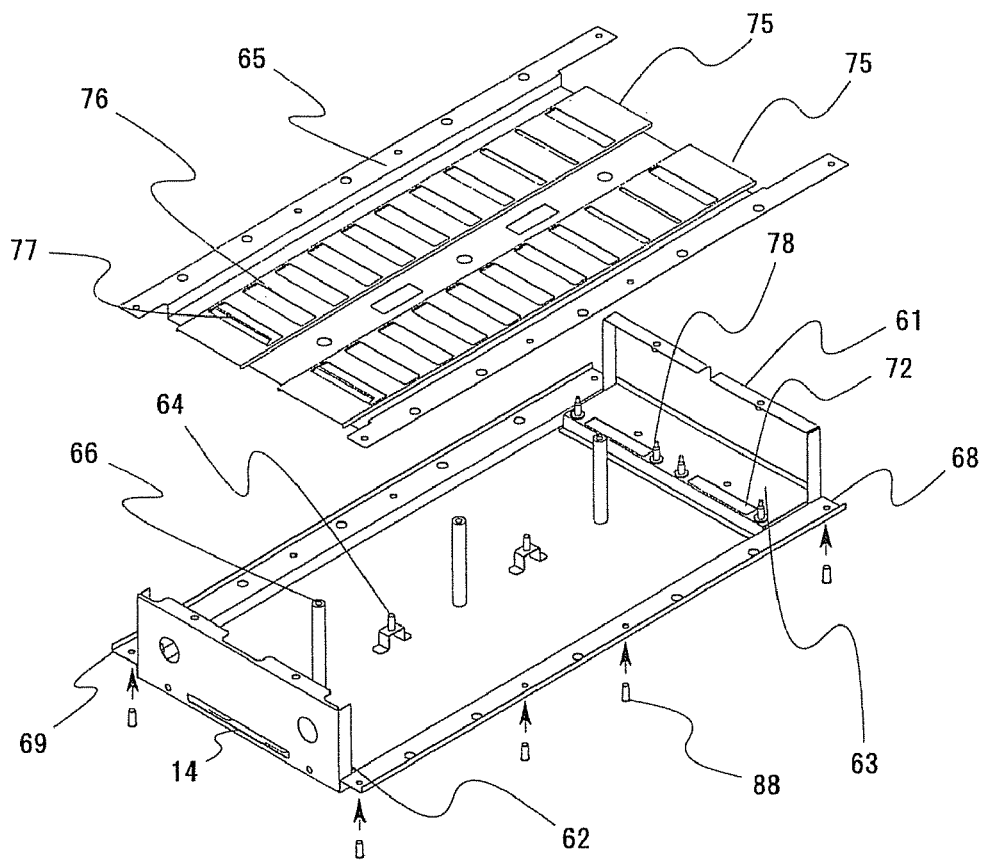
FIG. 6 is an exploded perspective view of lower cover components of the battery module.

As shown in FIG. 6, the lower cover 45 is constituted of six types of parts: a lower cover base 61, a (cooling air) introducing side fixing table 62, a (cooling air) discharging side fixing table 63, block fixing bases 64, a reinforcing louver 65, and center poles 66.

The lower cover base 61 constitutes a front face, a bottom face, and a back face of the module case 9a. On a front face portion of the lower cover base 61, circular holes for taking out a positive electrode high voltage cable 81 and a negative electrode high voltage cable 82 (refer to FIG. 3) are formed respectively on both sides of the center thereof, and on a lower side thereof, a slit-shape intake 14 for introducing cooling air is formed. Further, an upper face side and side ends of left and right side faces of the front face portion of the lower cover base 61 are bent in an L shape. On the other hand, on a lower side of a back face portion of the lower cover base 61, a slit-shape exhaust port 15 for exhausting cooling air is formed at a position corresponding to the intake 14 formed in the front face portion (refer to FIG. 2, FIG. 7). From a bottom face portion of the lower cover base 61, lower cover flange portions 68 are extending outward laterally from the left and right sides, which are located higher than the bottom face of the lower cover base 61 and have a substantially horizontal face. On end portions of the lower cover flange portions 68, bent ribs 69 which are bent upward are formed respectively.

On the front face portion side of the bottom face portion of the lower cover base 61, the introducing side fixing table 62 for fixing the block bases 41 of the cell pack block 40 from the front face side, and guiding the cooling air introduced from the intake 14 to the reinforcing louver 65 is fixed (also refer to FIG. 7). On the other hand, on the back face portion side of the bottom face portion of the lower cover base 61, the discharging side fixing table 63 are fixed for fixing the block bases 41 of the cell pack block 40 from the back face side, and guiding the cooling air distributed through the battery module 9 to the exhaust port 15 via two discharge ports 72 formed in an upper face thereof (also refer to FIG. 7). Also, along the center in a longitudinal direction of the bottom face portion of the lower cover base 61, the center poles 66 (also refer to FIG. 3) for supporting a center portion in the longitudinal direction of the upper cover 46 and coupling (fastening by screws) to the upper cover 46 and the block fixing bases 64 for fixing the block flanges B44 of the block base 41 of the cell pack block 40 are fixed alternately. With this structure, an excellent cooling characteristic can be obtained despite that the entire shape has a relatively small size.

Further, on the lower cover base 61, the reinforcing louver 65 is fixed for reinforcing strength of the bottom face of the lower cover base 61 and for supplying cooling air to each of the cell pack blocks 40. The center in a longitudinal direction of the reinforcing louver 65 is in contact with the bottom face portion of the lower cover base 61, and circular holes and rectangular holes for inserting the center poles 66 and the block fixing bases 64 fixed to the lower cover base 61 are formed therein. Both sides sandwiching the center in the longitudinal direction of the reinforcing louver 65 are one step higher (hereinafter, these portions are referred to as duct forming portions), and these portions forms with the lower cover base 61 ducts 75 having a rectangular-shape opening cross-section. In the duct forming portions of the reinforcing louver 65, rectangular ventilation holes 76 are formed at positions corresponding to positions between the cells 10 constituting the cell packs 19 (also refer to FIG. 7). A substantially half of an opening area of the closest ventilation hole to the intake 14 is covered by a rib-shape blocking louver 77 which inclines obliquely. With the above-described structure, an excellent cooling effect can be obtained with a small number of parts.

Both lateral sides of the duct forming portions of the reinforcing louver 65 are, similarly to the center in the longitudinal direction, in contact with the bottom face portion of the lower cover base 61. Ends on both lateral sides of the reinforcing louver 65 stand up, and further the flange portions having a substantially horizontal face extend outward laterally from the left and right sides. The flange portions of the reinforcing louver 65 are in contact by surface with the lower cover flange portions 68 of the lower cover base 61 and fixed thereon. Also, the reinforcing louver 65 is cut out in the front face and back face portions so as to avoid positions of the introducing side fixing table 62 and the discharging side fixing table 63 fixed to the lower cover base 61. Note that an end on the introducing side fixing table 62 side of the duct forming portions of the reinforcing louver 65 is inserted in the introducing side fixing table 62 so that the ducts 75 communicate with the intake 14 (also refer to FIG. 7). With such a structure and a configuration, an excellent cooling characteristic can be obtained.

As shown in FIG. 3, two cell pack blocks 40 are fixed in parallel on the lower cover 45. Specifically, stud bolts 78 formed to stand on the introducing side fixing table 62 and the discharging side fixing table 63 are inserted in the circular holes 47 on the both ends of the block bases 41 of the respective cell pack blocks 40, and are fixed by nuts including springs. Also, the block flanges B44 of the block bases 41 of the cell pack block 40 are fixed together by nuts including springs so as to oppose each other on the block fixing bases 64. By disposing two cell pack blocks in parallel, the entire battery module becomes relatively small.

Figure 10:
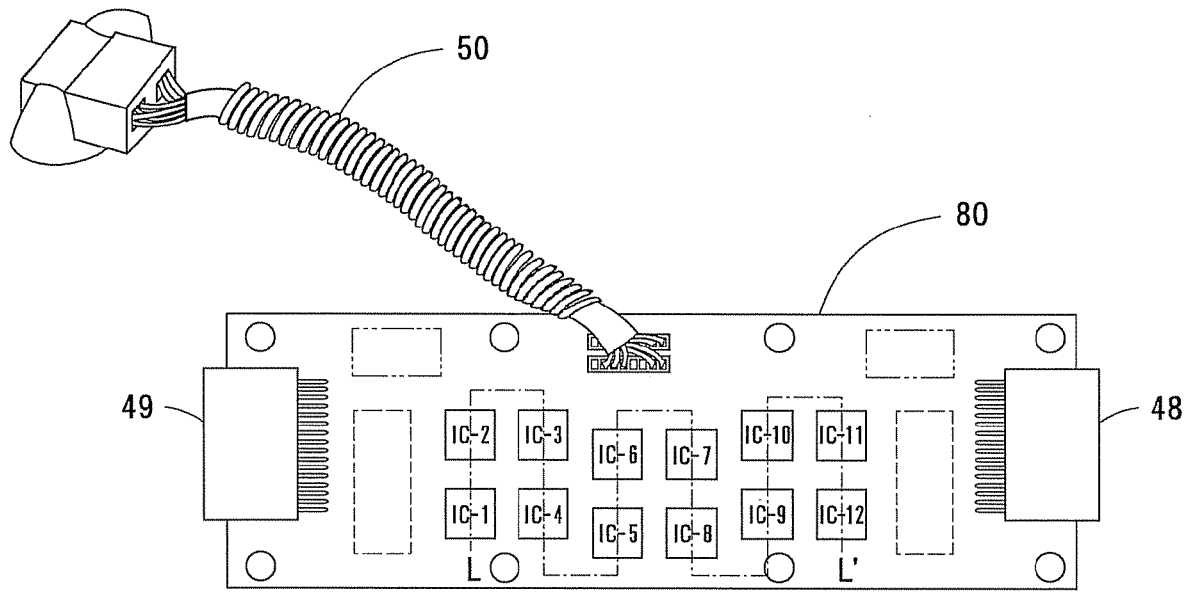
FIG. 10 is a plan view schematically showing a substrate constituting a cell-con, partially including a cross-sectional view.

On the discharging side fixing table 63, a C/C box 79 including a cell controller (hereinafter, abbreviated to cellcon) 80 is fixed to the lower cover base 61 by screws. As shown in FIG. 10, the cell-con 80 is constituted of a single substrate which is laterally long and has printed wirings on both faces, and is fixed in a standing state by screws via circular holes formed at four respective vertical positions inside the C/C box 79. The substrate having ICs is arranged in a relationship to oppose side faces of the cells constituting the cell packs, which makes the entire module relatively small. Also, complexity in wirings of the respective cell packs and the cell-con 80 can be eliminated.

Connecting connectors 48, 49 are mounted on ends on both left and right sides of the substrate constituting the cell-con 80, and a harness connector (omitted in FIG. 5) attached to one side of the voltage detecting harness 52 is connected to the connecting connectors 48, 49 of the cell-con 80. Specifically, as shown in FIG. 3, the voltage detecting harness 52 is lead out for each of the cell pack blocks 40, and as described above, since two cell pack blocks 40 are accommodated in a battery module 9, two connecting connectors 48, 49 are mounted on the cell-con 80. By arranging connectors respectively for the two cell pack blocks, the wiring operation becomes simple. Also, maintenance can be performed easily.

Further, on the substrate of the cell-con 80, twelve ICs IC-1 to IC-12 are mounted corresponding to the twelve cell packs 19 accommodated in a battery module 9. These ICs are mounted in order according to potentials of the cell packs 19, but details thereof will be described later with a circuit diagram. Also, a communication harness 50 for communicating with a battery controller 20 (refer to FIG. 15, FIG. 17) is lead out from the substrate of the cell-con 80, and the communication harness 50 has a connector on a tip portion thereof. This connector is connected to a connecting connector (not shown) on the battery controller 20 side. Note that although chip elements such as resistors, capacitors, and so on are mounted on the substrate of the cell-con 80, these elements are omitted in FIG. 10. On the substrate of the cell-con 80, the connectors 48, 49 are provided respectively for the two cell pack blocks, and the communication harness 50 for communicating with the battery controller 20 is provided separately from these connectors. By providing the connectors and the communication harness separately in this manner, the wiring operation becomes simple, and also maintenance becomes simple.

The cell pack blocks 40 fixed in parallel on the lower cover 45 are connected with each other in series by block connecting bus bars, which are omitted in the drawing. Grommets are fixed to the circular holes formed in the front face portion of the lower cover base 61, through which a positive electrode high voltage cable 81 and a negative electrode high voltage cable 82 are lead out respectively (refer to FIG. 3). In this manner, the battery module 9 has 12 cell packs 19 connected in series and constitutes a battery with a nominal voltage of 170 V and a capacity of 5.5 Ah.

Note that in the following, when identification of the 12 cell packs 19 and the 48 cells 10 constituting these cell packs is needed, for convenience a cell pack 19 on the highest potential side is denoted as cell pack AB1, a cell pack 19 having the next highest potential is denoted as cell pack AB2, . . . , and a cell pack 19 on the lowest potential side is denoted as cell pack AB12. A cell 10 having the highest potential in the cell pack AB1 on the highest potential side is denoted as cell B1, a cell 10 having the next highest potential in the cell pack AB1 is denoted as cell B2, . . . , a cell 10 having the lowest potential in the cell pack AB12 on the lowest potential side is denoted as cell B48, and a cell 10 having the next lowest potential in the cell pack AB12 is denoted as cell B47, where reference numerals are designated in order from the highest potential side to the lowest potential side for explanation (refer to FIG. 11). Therefore, in the battery module 9 of this embodiment, by connecting the cell pack AB1 on the highest potential side to the cell pack AB12 on the lowest potential side in series, the cell B1, . . . , cell B48 constituting these cell packs are connected in series. Also, the above-described temperature sensors are arranged in four cell packs 19, the cell packs AB1, AB2, AB11, AB12, and are attached respectively to the cells 10 (B1, B5, B41, B45) on the highest potential side in these cell packs 19 for example.

As shown in FIG. 3, the upper cover 46 constitutes a left side face, an upper face, and a right side face of the module case 9a. The upper cover 46 has a characteristic shape, and has upper cover narrow portions 84 formed by narrowing front face and back face sides. Specifically, both ends of the left side face, the upper face, and the right side face of the upper cover 46 are bent and narrowed toward the front face side and the back face side of the lower cover base 61 respectively, so as to increase durability in a torsional direction of the entire module case 9a. Also, on left and right side faces of the upper cover 46, collar guides 85 restricting movement of collars 91 (refer to FIG. 12) which will be described later are welded. From left and right sides of the upper cover 46, upper cover flange portions 86 each having a substantially horizontal face extend outward. On the upper cover flange portions 86, flange portion recesses 87 are formed so as to avoid the block flanges A43 projecting from the block bases 41 in a state that the block flanges A43 are placed on the lower cover flange portions 68.

The lower cover flange portions 68 and the upper cover flange portions 86 are fastened by screws and stud bolts. Also, the front face portions and the back face portions of the upper cover narrow portions 84 and the lower cover base 61 are fastened by screws. Note that the upper cover narrow portions 84 forms steps from the upper face of the upper cover 46, and thus screw heads after being fastened do not projects from the upper face of the upper cover 46 (also refer to FIG. 2). Further, female screws are formed on top portions of the center poles 66 provided to stand up on the lower cover base 61, and the upper cover 46 and the lower cover 45 are fastened by screws also at these positions. As described above, the module case 9a has a structure with high mechanical strength against a force in a torsional direction. Also, the structure can be easily assembled and is excellent in productivity.

<Cooling System of the Battery Module>

As shown in FIG. 7, the battery module 9 adopts a forcible cooling method to cool the respective cells 10 forcibly by the blower fan 17. Specifically, the cooling system of the battery module 9 has a structure such that cooling air introduced from the intake 14 passes through the inside of the introducing side fixing table 62 of the lower cover 45, flows through the ducts 75 formed by the reinforcing louver 65 and the lower cover base 61 and corresponding to the respective cell pack blocks 40, passes through the respective ventilation holes 76 formed in (the duct forming portions of) the reinforcing louver 65, flows around the respective cells 10 constituting the respective cell packs 19 and converges in the space formed with the upper cover 46, passes from the discharge ports 72 formed in the upper face of the discharging side fixing table 63 through a lower side of the C/C box 79 to exit via the exhaust port 15. With such a structure, the battery module 9 has a structure which is compact and further has an excellent cooling effect.

The above-described arch-shape louver 36 and cross-shape louver 37 have a function as a support post between the two holders 11 constituting the cell pack 19, and a function as an inner louver. Here, important points for cooling are positions of the ventilation holes 76 formed in the reinforcing louver 65 and opening areas thereof. In this embodiment, the blocking louvers 77 are provided in the ventilation holes 76 which are closest to the introducing side, the opening areas are narrowed with distance from the introducing side, and areas of the ventilation holes 76 which are closest to the discharging side are made large. With this structure, an excellent cooling effect can be obtained.

Since the cooling air which exchanged heat by forcible cooling converges on the discharging side, a method to send a large amount of cooling air having a low temperature has a large effect in addition to the method of increasing flow speed by narrowing the opening areas of the ventilation holes 76. For example, an optimum cooling system can be constructed by setting a ratio of the opening areas of the ventilation holes 76 to 0.7, 0.25, 0.4, 0.7, 0.8, 1.0, 1.0, 1.0, 1.0, 1.0, 0.65 from the exhaust side, assuming that the center one being 1.0.

<Cell-con>

As described above, the cell-con 80 has a plurality of ICs, for example 12 ICs IC-1 to IC-12 in this embodiment. These ICs correspond to the cell packs AB1 to AB12 respectively. Specifically, the IC-1 corresponds to the cell pack AB1 on the highest potential side, the IC-2 corresponds to the cell pack AB2 having the next highest potential, and the IC-12 corresponds to the cell pack AB12 on the lowest potential side.

Figure 11:
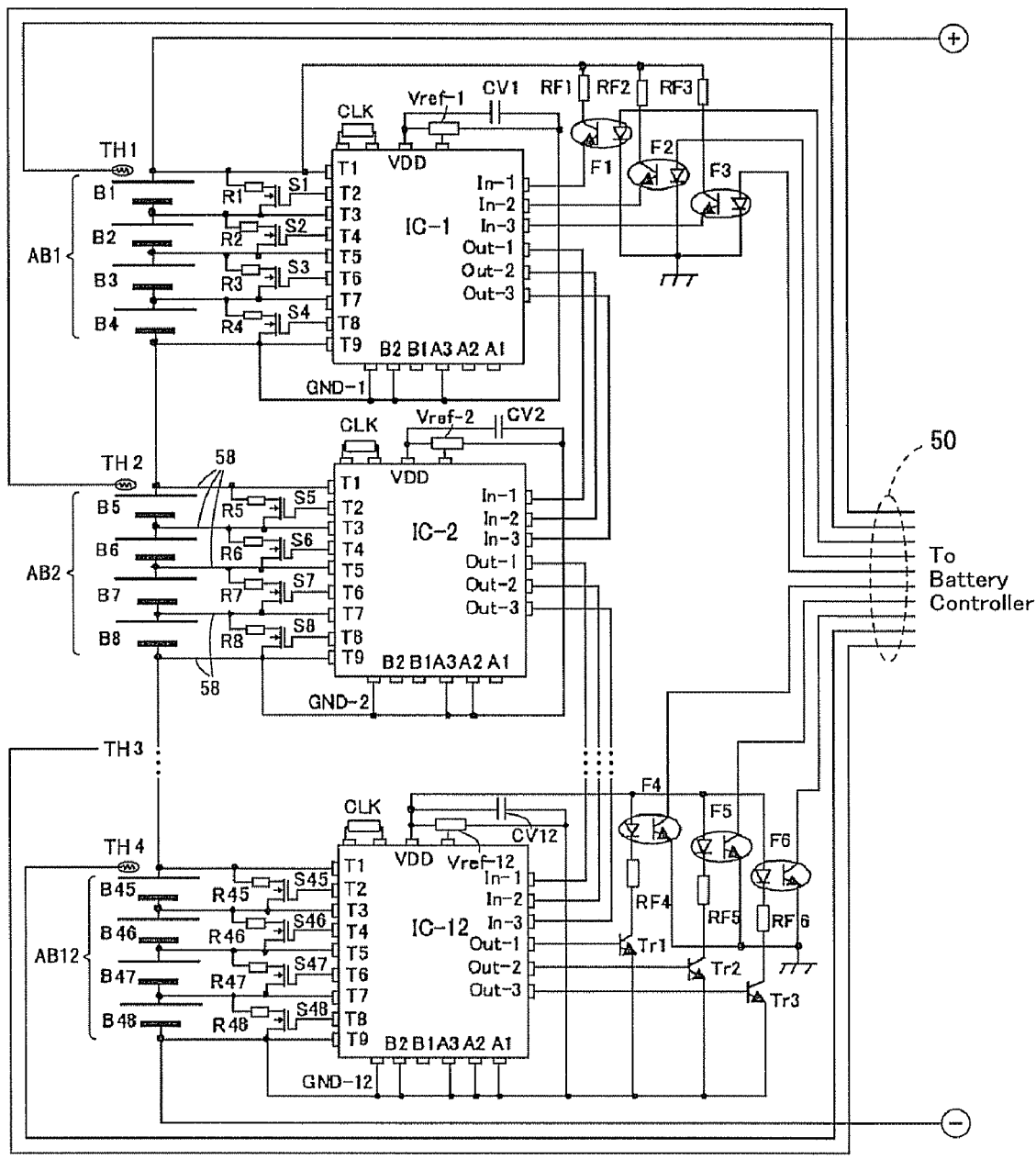
FIG. 11 is a circuit diagram of the cell-con.

As shown in FIG. 11, the IC-1 which detects voltages of the respective cells B-1 to B-4 constituting the cell pack AB1 on the highest potential side has terminals T1, T3, T5, T7, T9, and these terminals are connected to the voltage detecting lines 58 lead out from the cell pack AB1. Also, between positive and negative electrodes of each cell, a capacity adjusting circuit constituted of a resistor (for example R1) and a switch element (for example S1) such as FET is inserted. Specifically, a resistor having one end connected to the positive electrode side of a cell has the other end connected to the drain of a switch element, and the source of the switch element is connected to the negative electrode side of the cell. Also, gates of the switch elements are connected to the terminals T2, T4, T6, T8 of the IC-1, respectively. This structure is the same for the IC-2 to IC-12. Therefore, when adjustment of the capacity (voltage) of the cell B2 is performed for example, a high-level (binary) signal is outputted to the terminal T4 for a predetermined time period while charging/discharging to allow an electric current to flow across the drain terminal and the source terminal of the switch element S2 via the resistor R2, and the electric current is heat-consumed in the resistor R2, thereby enabling adjustment of the capacity of the cell B2.

Further, since the cell packs AB1 to AB12 are connected in series, the IC-1 to IC-12 are connected in series also. However, the internal circuit of the IC-1 for example operates with the negative electrode of the cell B4 being a reference potential GND-1 corresponding to the cell pack AB1. Therefore, reference potentials GND-1, GND-2, . . . , GND-12 are separate grounds used in internal circuits of the IC-1, IC-2, . . . , IC-12, respectively. On the other hand, states of the respective cells detected by the respective ICs shown in FIG. 11, for example detected values of terminal voltages of the respective cells, are sent, and the reference potential namely the ground for the battery controller 20 is the same as the potential of the vehicle body of a hybrid truck (refer to FIG. 17) and is the reference potential, namely the ground potential, of the low voltage battery mounted in this vehicle. By separating the reference potential for the high voltage system and the reference potential for the low voltage system, and setting the reference potential of the low potential system to the vehicle body potential of the vehicle, safety can be maintained.

The IC-1 to IC-12 have signal input terminals In-1, In-2, In-3 and signal output terminals Out-1, Out-2, Out-3, respectively. The signal input terminal In-1 of the IC-1 on the highest potential side is connected to the emitter of a light reception side transistor of a photo coupler F1, and the collector of the light reception side transistor has one end connected to the other end of the resistor RF1 having one end connected to the positive electrode of the cell B1. Similarly, the signal input terminal In-2 is connected to the emitter of a light reception side transistor of a photo coupler F2, and the collector of the light reception side transistor is connected to the other end of a resistor RF2 having one end connected to the positive electrode of the cell B1. Also, the signal input terminal In-3 is connected to the emitter of a light reception side transistor of a photo coupler F3, and the collector of the light reception side transistor is connected to the other end of a resistor RF3 having one end connected to the positive electrode of the cell B1. Therefore, the photo couplers F1, F2, F3 are all supplied with current from the positive electrode of the cell B1. Cathodes of light emitting diodes of the photo couplers F1, F2, F3 are connected to the ground, and anodes thereof are connected to the battery controller 20 via the communication harness 50.

On the other hand, the signal output terminal Out-1 of the IC-12 on the lowest potential side is connected to the base of a transistor Tr1, and the collector of the transistor Tr1 is connected to the cathode of a light emitting diode of a photo coupler F4 via a resistor RF4. Similarly, the signal output terminal Out-2 is connected to the base of a transistor Tr2, and the collector of the transistor Tr2 is connected to the cathode of a light emitting diode of a photo coupler F5 via a resistor RF5. Also, the signal output terminal Out-3 is connected to the base of the transistor Tr3, and the collector of the transistor Tr3 is connected to the cathode of a light emitting diode of a photo coupler F6 via a resistor RF6. Anodes of light emitting diodes of the photo couplers F4, F5, F6 are all connected to a reference voltage output terminal VDD of the IC-12, and supplied with current from the reference voltage output terminal VDD. Emitters of the photo couplers F4, F5, F6 are all connected to the ground, and collectors thereof are connected to the battery controller 20 via the communication harness 50.

The battery controller 20 and the cell-con 80 are insulated by the above-described photo couplers F1, . . . , F6, and hence the ground of the battery controller 20 (refer to FIG. 17) and the respective reference potentials GND-1, GND-2, . . . , GND-12 are insulated from each other. By having such a configuration, it is possible to send/receive signals between the respective ICs having different reference potentials and the battery controller which operates by the reference potential of the low potential battery. The cells 10 are lithium secondary cells, and terminal voltages of the cells vary largely according to a charge/discharge state. Accordingly, it is necessary to make the respective ICs change their reference potentials corresponding to potentials of the cells as targets of measurement. This embodiment has a circuit configuration such that the reference potentials of the respective ICs can be determined by receiving the potential of a predetermined cell in the cells connected in series, namely, a measured cell, and thereby the reference potentials of the respective ICs are adjusted automatically according to a potential variation of the measured cell. With the above-described circuit configuration, sending/receiving of signals can be performed normally between the respective ICs and between the battery controller 20 and the ICs even when there is a variation in reference potentials of the respective ICs.

Meanwhile, the signal output terminals Out-1, Out-2, Out-3 of the IC-1 on the highest potential side are connected respectively to the signal input terminals In-1, In-2, In-3 of the lower order IC-2 in an electrically non-insulated state, and the signal output terminals Out-1, Out-2, Out-3 of the IC-2 are connected respectively to the signal input terminals In-1, In-2, In-3 of the lower order IC-3 in an electrically non-insulated state. Similarly, the signal output terminals Out-1, Out-2, Out-3 of the IC-3 and the following ICs are connected respectively to the signal input terminals In-1, In-2, In-3 of the lower order IC thereof in an electrically non-insulated state, until reaching the IC-12. Therefore, the signal output terminals Out and the signal input terminals In of the respective ICs are connected in a chain structure in a state of not being insulated. By having such a structure, it is possible to send/receive signals between the respective ICs having different reference potentials with a relatively simple circuit configuration, and it is also possible to send/receive signals between the respective ICs having different reference potentials and the battery controller operating by the reference potential of the low potential battery.

The ICs are each constituted including: a multiplexer for selecting a cell as a target of detecting a voltage in the cell packs; an AD converter for converting an analog voltage of the cell selected by the multiplexer into a digital voltage; a reference power supply circuit which generates a constant voltage (5 V for example) from the total voltage of a corresponding cell pack, generates a highly precise voltage from the constant voltage, and takes this highly precise voltage into the IC from a terminal Vref (for example, Vref-1 in the case of IC-1); a clock generating circuit which generates a clock frequency using an oscillator CLK connected to an external terminal; a logic circuit for performing arithmetic operation by the clock generated by the clock generating circuit; an input circuit having an input side connected to the signal input terminals In and an output side connected to the logic circuit; and an output circuit having an input side connected to the logic circuit and an output side connected to the signal output terminals Out. Note that the internal configuration of the IC itself is described in detail in Japanese Patent Application Laid-open No. 2003-70179 described in the Related Art section.

Differences in the IC-1 to IC-12 are potentials of error correcting terminals A1 to A3 and terminals B1 and B2 provided in each of them. To these terminals, according to voltage detection errors which the IC-1 to IC-12 have separately, a digital value of "1" or "0" can be given to the terminals A1 to A3 or the terminals B1 and B2. Here, "1" is the reference potential VDD for the ICs, and "0" is the potential of each reference potential GND-1, GND-2, . . . , GND-12 of each IC. The voltage detecting errors are different in the IC-1 to IC-12, and thus the "1" or "0" differs in the terminals A1 to A3 and terminals B1 and B2 as shown in FIG. 11.

The AD converter in each IC has an integrating unit which integrates a unit electric quantity according to the number of pulses of the clock generated by the clock generating circuit, a comparing unit which compares an integrated value from the integrating unit and the voltage of a cell as a target of detecting voltage and stops the pulse, a counting unit which outputs the number of pulses when the pulse is stopped by the comparing unit, and a correcting unit which corrects the output of a counter of the counting unit according to digital values given to the error correcting terminals A1 to A3, B1, B2. The correcting unit corrects an error by varying a coefficient value in the counter according to digital values given to the error correcting terminals A1 to A3, B1, B2 to correct an offset in AD conversion, and varying the pulse width of the clock generated by the clock generating circuit via the logic circuit to correct the gain of the AD conversion. This analog-digital converting apparatus, namely AD converter, enables highly accurate voltage detection with a structure as described above, and hence is the most preferable structure. However, an AD converter of a successive comparison type can also be used.

Note that the capacitors CV1, CV2, CV12 with one end connected to the reference voltage output terminal VDD and the other end connected to the respective reference potentials GND-1, GND-2, . . . , GND-12 are capacitors for starting operation of the logic circuits and so on in the respective ICs. More specifically, when voltages of these capacitors CV become equal to or higher than a specified value, the logic circuits and so on in the respective ICs start to operate.

<Cell-con Mounting Substrate>

As shown in FIG. 11, mounting of all the elements constituting the cell-con 80 compactly on a single substrate requires a high degree of contrivance, in view of constraint that the cell-con 80 is constituted of, besides the 12 ICs, a large number of chip elements attached externally to these ICs, and constraint that the signal output terminals Out and the signal input terminals In of the respective ICs are connected in an electrically non-insulated state in a chain structure. As shown in FIG. 10, the 12 ICs IC-1 to IC-12 are positioned and mounted corresponding to connection states of cells as measurement targets. Potentials of cells connected in series as described above vary according to charged/discharged states of the battery, and potentials of cells as measurement targets of the respective ICs change. Accordingly, reference potentials of the ICs change automatically. It is needed to perform sending/receiving of a signal accurately between these changing ICs. Therefore, it is desirable to arrange ICs each including a measurement circuit in a positional relationship related to the relationship of the serial connection of the cells as measurement targets. In this manner, complexity in signal transmission between ICs having different potentials is eliminated. Also, the signal transmission becomes simple, and reliability of sending/receiving signals becomes high. The signal transmission between ICs having different potentials can be influenced in various ways, and hence it is desirable to reduce the possibility of being influenced by external noise or stray capacitance for example. In this embodiment, the aforementioned influences are reduced by arranging the ICs in a related manner to the connection relationship of the cells. Also, since the respective ICs are in a positional relationship such, that ones having close reference potentials are arranged closely, wirings for signal transmission become short, and various adverse influences such as the above influences are reduced. Thus, high reliability can be obtained.

In this embodiment, specifically, the ICs are mounted two by two on rectangular longer sides of a rectangular continuous straight line L-L' defined on the substrate in order from the IC-1 on the highest potential side to the IC-12 on the lowest potential side continuously according to an order of potentials of the cell packs. Also, in this embodiment, for mounting the 12 ICs in a most compact manner, distances (lengths) between rectangular shorter sides of the rectangular continuous straight line L-L' are set to be the same. The ICs are mounted such that ones having close reference potentials are arranged closely.

Further, since the resistors R1 to R48 generate heat during capacity adjustment in the capacity adjusting circuits each constituted of a resistor (R1 for example) and a switch element (S1 for example), the resistors R1 to R48 are mounted by dividing in two in regions (dashed-line regions in FIG. 10) in the vicinity of the connecting connectors 48, 49 separated from the rectangular continuous straight line L-L'. Note that the switch elements themselves are mounted inside the ICs (the switch elements are shown intentionally outside the ICs in FIG. 11 for clarity of configurations of the capacity adjusting circuits). On the other hands, the photo couplers F1 to F3, the resistors RF1 to RF3, and the photo couplers F4 to F6, the resistors RF4 to RF6, the transistors Tr1 to Tr3 are arranged by dividing in two on the input side and the output side, close to the connector from which the communication harness 50 is lead out, in upper regions (chain double-dashed line regions in FIG. 10) of the substrate. Note that other chip elements are mounted in the vicinity of the corresponding ICs. With such an arrangement, both the reduction in size and the improvement of reliability are possible.

<<Power Supply System>>

Figure 12:
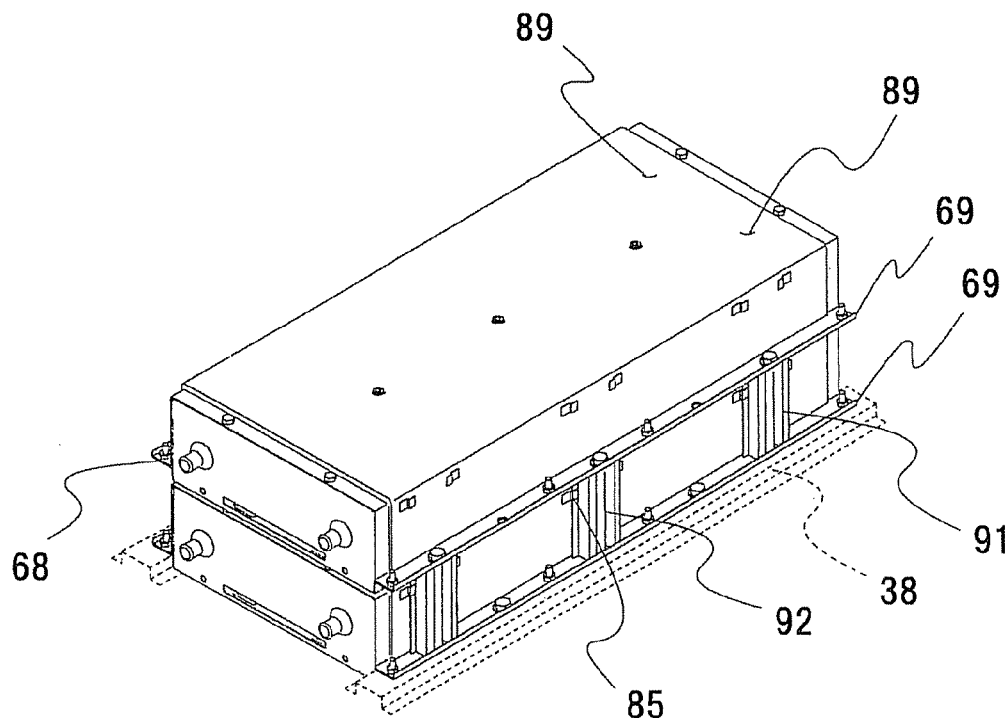
FIG. 12 is an exterior perspective view showing a fixed state of battery modules in the power supply system.
Figure 13:
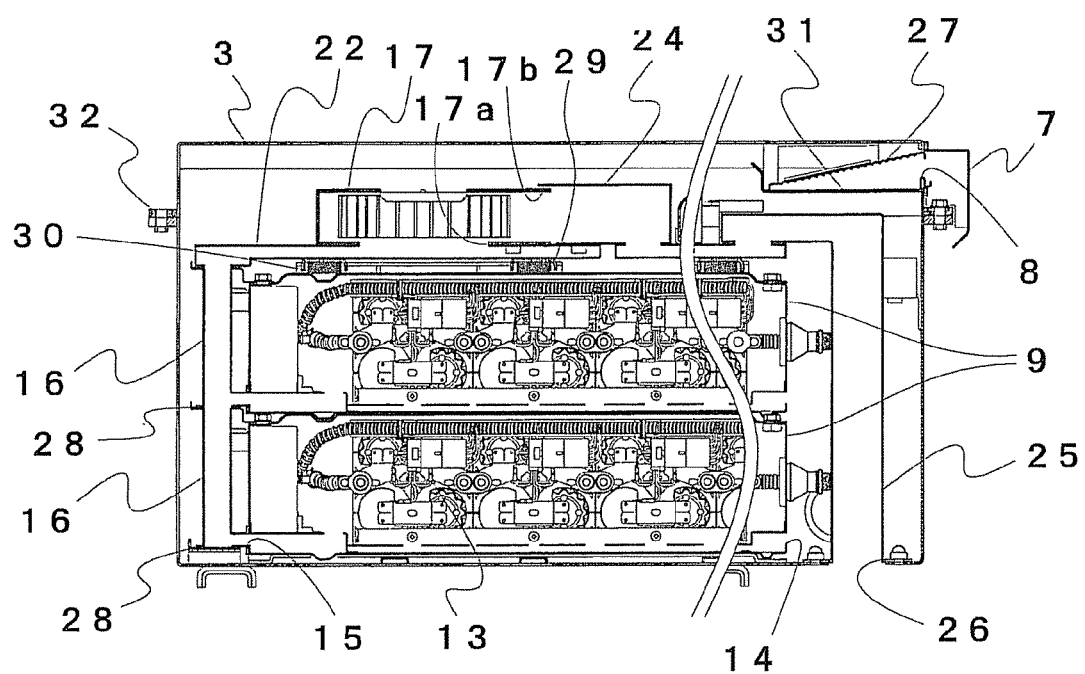
FIG. 13 is a cross-sectional view showing the battery modules accommodated in an external box of the power supply system, arrangement of a blower fan and positions of forming exhaust paths formed in the external box.
Figure 14:
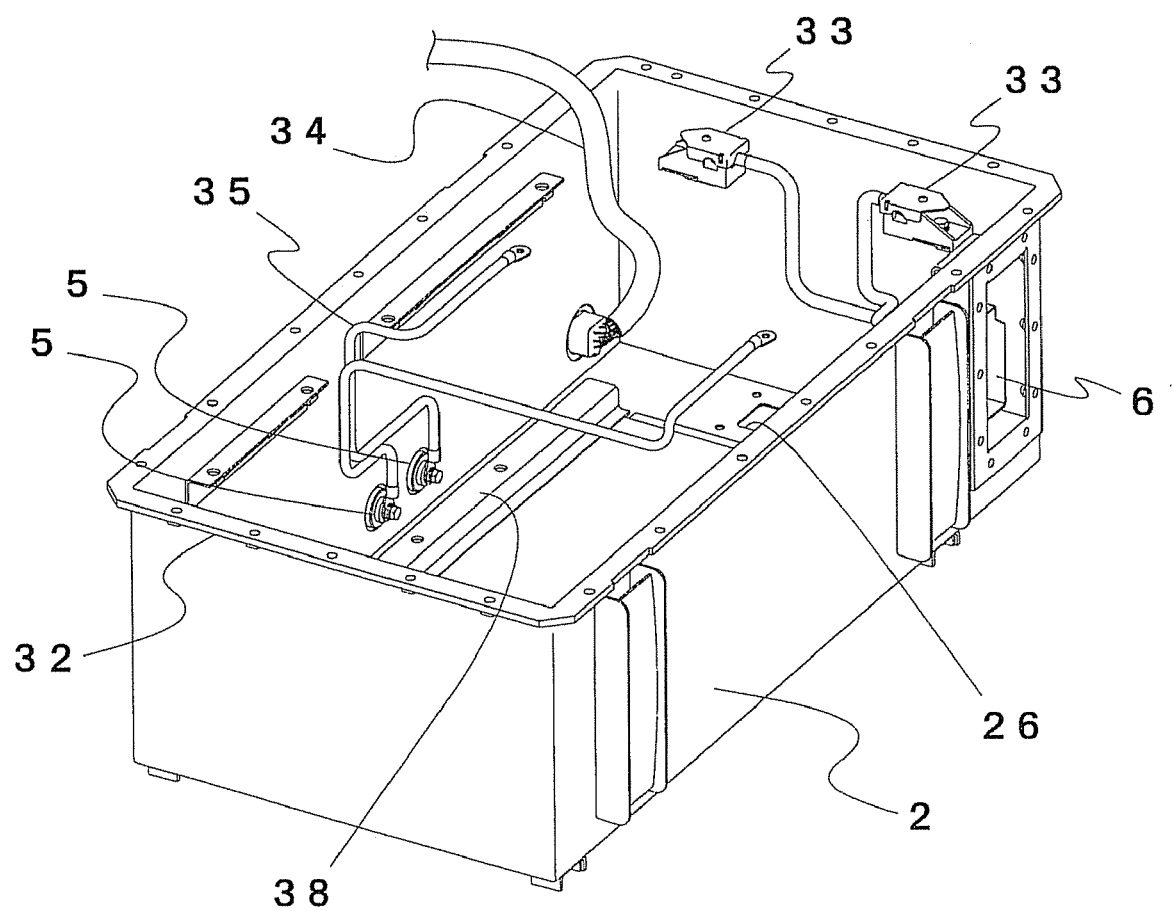
FIG. 14 is a perspective view of a lower container of the external box showing a state that cables are attached during assembly of the power supply system.

As shown in FIG. 14, the lower container 2 of the external box 1a has a base 38 for fixing the battery module 9. As shown in FIG. 12 and FIG. 13, battery modules 9 are stacked in two levels on the base 38 and accommodated therein.

In the collar guides 85 of the battery module 9 (at the first level) arranged on the lower side, a collar 91 having a channel-shape cross-section is inserted, and the collar 91 is in contact with the lower cover flange portions 68 of the battery module 9 at the second level. This positioning is done by lower cover projections 73 (refer to FIG. 7) provided to project on the lower cover 45 and upper cover recesses 89 formed in the upper cover 46. The lower cover projections 73 and the upper cover recesses 89 have recessed and projecting truncated cone shapes respectively, and located at two positions in back portions of the battery modules 9 respectively (right side in FIG. 12, left side in FIG. 7). Accordingly, the battery module 9 at the second-level is arranged with the lower cover projections 73 being engaged with the upper cover recesses 89 of the battery module 9 on the lower side. A long bolt 92 is inserted in the space inside the collar 91 via the lower cover flange portions 68 of the second level battery module 9, thereby fixing the battery module 9 at the second level to the lower side battery module.

On the other hand, the battery module 9 arranged on the lower side is fixed to the base 38 directly with four bolts, and the second-level battery module 9 is fixed via the collars 91 with six bolts. Stacking arrangement of the battery modules 9 becomes possible by forming the upper cover recesses 89 in the upper cover 46 and forming the lower cover projections 73 on the lower cover 45, which allows a three-dimensional arrangement and thereby improves the spatial use ratio as compared to a planar arrangement. Note that since the lower cover flange portions 68 are located higher than the bottom face of the lower cover 45, positioning or fixing during attachment can be performed easily.

On the end face of the module case 9a in which the exhaust port 15 is formed, a ventilation duct 16 for guiding the cooling air from the battery modules 9 is attached. The ventilation duct 16 is close to the end face in which the exhaust port 15 is formed, and is fixed by fastening with screws on the module case 9a along this end face. The ventilation duct 16 is formed with a horizontal pipe coupled to the exhaust port 15 and a vertical pipe running along an end face of the module case 9a, and is formed to have a horizontal cross-section in a substantially T shape. The vertical pipe has rectangular openings formed in an upper end and a lower end thereof. The vertical pipe has a length (length in a direction along an end face of the module case 9a) that is set to approximately the same length as the height of the module case 9a. The horizontal pipe has a tip portion coupled to the exhaust port 15.

As shown in FIG. 13, the upper cover 3 constituting the external box 1a of the power supply system 1 has an inlet 8 in an end face on one side in the longitudinal direction (on the intake 14 side of the battery module 9), and the inlet 8 has a slit shape in the width direction of the external box 1a. Outside the position on the upper cover 3 where the inlet 8 is formed, a filter guard 7 having a substantially L-shape cross section so as to cover the inlet 8 is fixed. A tip of a horizontal portion of an upper part of the filter guard 7 is fixed to an upper side of the inlet 8. A vertical portion of the filter guard 7 extends to a lower side of the flange 32 so as to be separated from a wall-face of the lower container 2, and has a tip of a lower portion inclining toward the external box 1a side. Accordingly, during high-pressure showering for washing the vehicle, the filter guard 7 has dimensions which allow the flange 32 to be used as a blocking plate, and has a structure with a long distance on a surface against entrance of water.

Inside the position of the upper cover 3 where the inlet 8 is formed, a filter 27 of a metal mesh welded on an aluminum plate is arranged obliquely with respect to the upper face of the upper cover 3 in a manner that an apparent cross-sectional area of the filter 27 increases. A lower side of the filter 27 is supported by a filter holder 31 arranged in parallel with the upper face of the upper cover 3. For the filter 27, a metal mesh on which wave processing is performed by 40 meshes with a wire diameter of 0.18 mm and an opening ratio of 51% in this example is used. When ventilation resistance was measured, this filter 27 exhibited ventilation resistance equivalent to that of 60 meshes by performing the wave processing on the metal mesh of 40 meshes, and hence the effect of the filter is equivalent to 60 meshes. On the other hand, on a bottom face of the external box 1a, a release port 26 in a substantially rectangular shape for discharging the cooling air exhausted from the battery module 9 to the outside of the external box 1a is formed on the side of the intake 14 formed in the module case 9a.

As described above, in the external box 1a, the two battery modules 9 are accommodated by stacking vertically. The ventilation ducts 16 attached to the exhaust port 15 side are also stacked, and are connected via a seal cushion 28 at a joint as if the ventilation ducts 16 are extended. On an upper side of the battery modules 9, the blower fan 17 which discharges the cooling air from the battery modules 9 to the outside of the external box 1a is arranged. The blower fan 17 has an inlet 17a and a discharge port 17b for cooling air. Between the battery modules 9 and the blower fan 17, a blower duct case 22 having a flat, substantially rectangular parallelepiped shape for leading (guiding) cooling air from the ventilation duct 16 to the blower fan 17 is arranged.

The blower duct case 22 is formed with a size that occupies almost half of the area of the upper face of the module case 9a, and a slit-shape opening is formed in a cross-section in the width direction of the module case 9a. On the blower duct case 22, case fixing cross bars 29 for fixing to a fixing bar disposed on an inner wall of the external box 1a are formed to project on both sides in the width direction respectively. Also, on lower sides of the case fixing cross bars 29, rubber materials 30 are arranged. Accordingly, when the case fixing cross bars 29 are fastened by screws on the fixing bars, the module case 9a is pressurized and fixed from the upper side via the rubber materials 30. The blower fan 17 is arranged on the upper face of the blower duct case 22, and the inlet 17a thereof is coupled to an opening formed in a substantially middle portion on the upper face of the blower duct case 22. At a position of the blower duct case 22 corresponding to the ventilation duct 16, a rectangular opening is formed in a lower face. This opening is coupled to an upper end portion of the ventilation duct 16.

On the upper side of the battery modules 9, a JB duct case 23 having a flat, substantially rectangular parallelepiped shape is arranged adjacent to the blower duct case 22 in a longitudinal direction. The JB duct case 23 is formed with a size that occupies almost half of the area of the upper face of the module case 9a, and a slit-shape opening is formed in a cross-section in the width direction of the module case 9a. On the JB duct case 23, similarly to the blower duct case 22, case fixing cross bars 29 are formed to project on both sides in the width direction respectively, and are fastened by screws to fixing bars disposed on the inner wall of the external box 1a. On an upper face of the JB duct case 23, a rectangular opening is formed on the blower fan 17 side, and this opening is coupled to the discharge port 17b of the blower fan 17 via an intermediate duct 24. On the upper face of the JB duct case 23, a rectangular opening is formed on a side opposite to the blower fan 17.

A discharge duct 25 for exhausting the cooling air from the blower fan 17 is arranged along the end face of the battery module 9 in which the intake 14 is formed. The discharge duct 25 is formed with a horizontal pipe coupled to the discharge port 17b of the blower fan 17 and a vertical pipe coupled to the release port 26 of the external box 1a. Accordingly, the discharge duct 25 is formed with a substantially L-shape cross-section in a height direction. A tip of the horizontal pipe is coupled to an opening formed in the upper face of the JB duct case 23. On a lower end portion of the horizontal pipe is coupled to the release port 26 formed in the bottom face of the external box 1a. With such a structure, a favorable cooling effect becomes possible.

Figure 16:
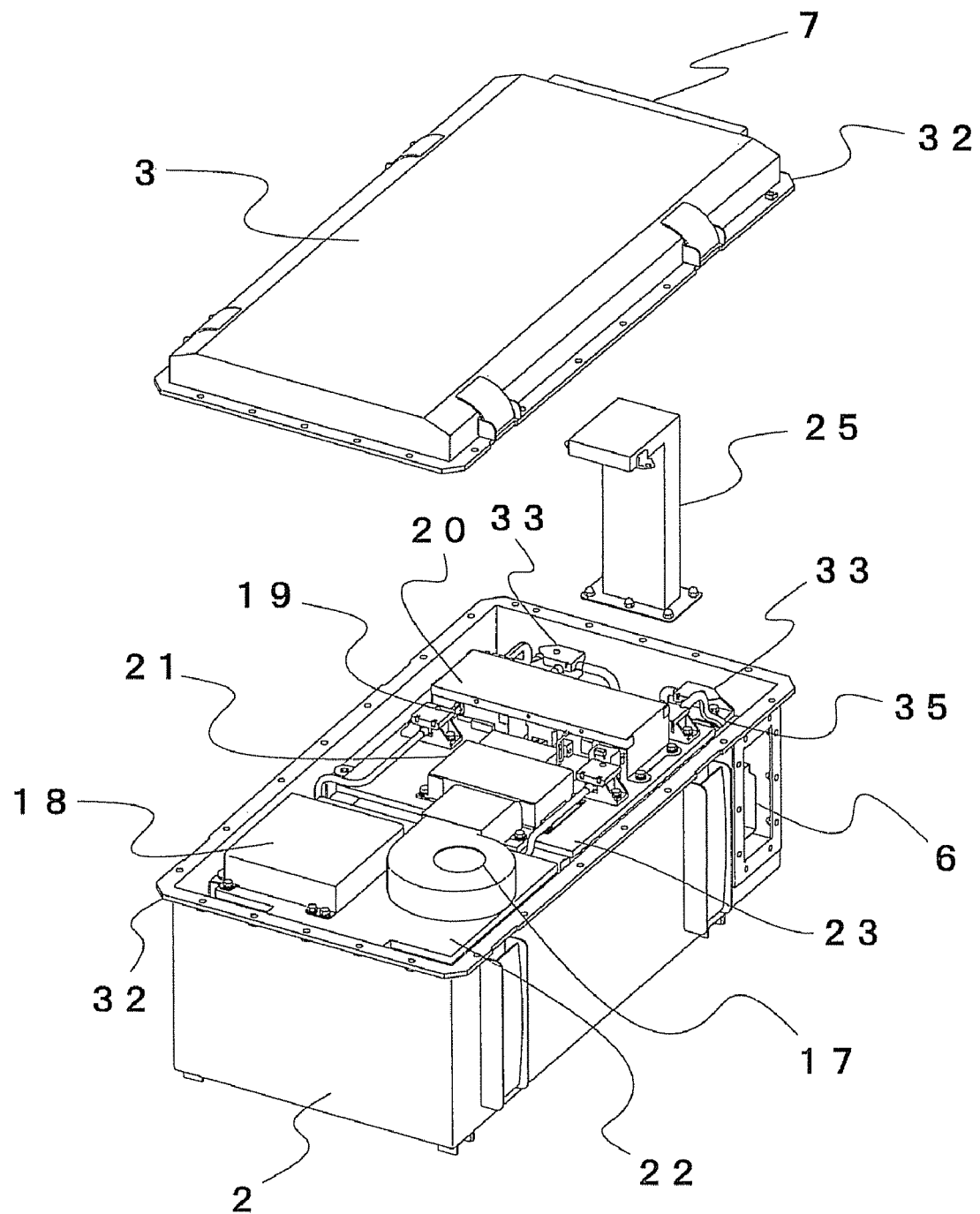
FIG. 16 is an exploded perspective view of the power supply system showing a state just before a discharge duct is attached during assembly of the power supply system.

As shown in FIG. 16, on the blower duct case 22, a junction box 18 including a plurality of high-voltage relays of the respective cells 10 constituting the battery module 9 is juxtaposed with the blower fan 17 and fixed by screws. On the other hand, in the JB duct case 23, a converter box 21 including a DC/DC converter which produces a 12 V power supply with a 24 V lead battery being a power supply, which is mounted on a hybrid truck and charged by an alternator, and the battery controller 20 controlling the entire power supply system 1 and communicating with a higher controller are disposed. By arranging an apparatus of a low-voltage system on the outside of the battery modules 9 which maintain a high voltage as described above, a small power supply system with high safety can be obtained.

<Cooling System of the Power Supply System>

As shown in FIG. 13, the external box 1a has the inlet 8 formed in the upper cover 3, and the release port 26 formed in the bottom face. The battery modules 9 accommodated in the external box 1a each have the intake 14 and the exhaust port 15 formed in the end faces on the both sides in the longitudinal direction respectively. The intake 14 is located on the side of the end face of the upper cover 3 in which the inlet, 8 is formed. The exhaust port 15 is coupled to the tip of the horizontal pipe of the ventilation duct 16, and the upper end portion of the vertical pipe of the ventilation duct 16 is coupled to the opening formed in the lower face of the blower duct case 22. The opening formed in the upper face of the blower duct case 22 is coupled to the inlet 17a of the blower fan 17, and the discharge port 17b of the blower fan 17 is coupled to the tip portion of the horizontal pipe of the discharge duct 25 via the intermediate duct 24 and the JB duct case 23. The lower end portion of the vertical pipe of the discharge duct 25 is coupled to the release port 26. Therefore, the ventilation duct 16, the blower duct case 22 and the blower fan 17 are in communication with each other, thereby forming an exhaust path in which the blower fan 17 and the discharge duct 25 are in communication with each other via the intermediate duct 24 and the JB duct case 23.

Cooling air passes through this exhaust path as follows. Specifically, by driving the blower fan 17, external cooling air is taken into the external box 1a from the inlet 8, and sucked into the battery modules 9 via the intakes 14. As described above, in the battery modules 9, the cooling air flows toward the exhaust port 15 side through gaps between the respective cells 10 and between the respective cell packs 19. The cooling air (having a temperature increased by exchanging heat in the battery modules 9) exhausted from the exhaust ports 15 proceeds upward along the end faces on one sides in the longitudinal direction of the battery modules 9 via the ventilation ducts 16, and taken into the blower fan 17 via the blower duct case 22. The cooling air discharged from the blower fan 17 is guided to the discharge duct 25 via the intermediate duct 24 and the JB duct case 23, falls down along the end faces on the other sides of the battery modules 9 and is released to the outside of the external box 1a from the release port 26. With this structure and arrangement, reduction in size of the power supply system becomes possible, and cooling with higher efficiency is possible.

<High Voltage Circuit of the Power Supply System>

Figure 17:
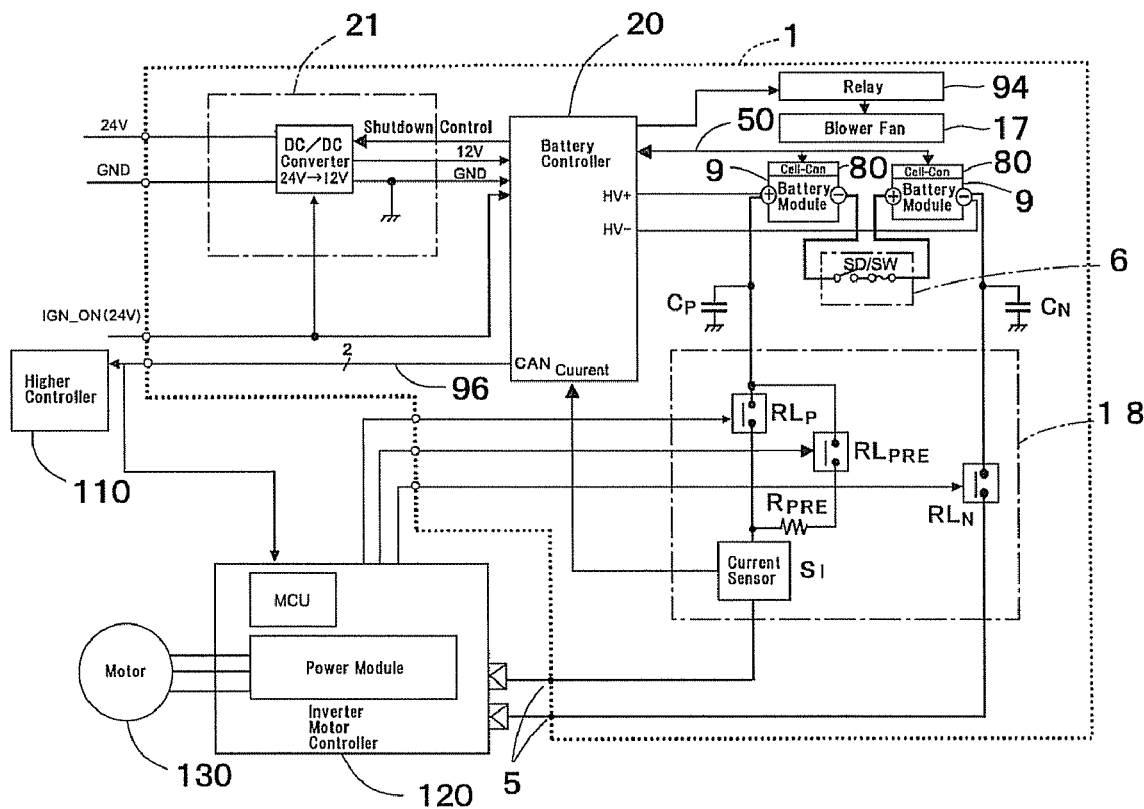
FIG. 17 is a circuit diagram of the power supply system.

As shown in FIG. 17, the positive electrode high voltage cable 81 of one (lower potential side) of the vertically stacked battery modules 9 is connected to a fuse side of an SD (service disconnect) switch 6 for maintenance and inspection in which a switch and a fuse are connected in series, and the negative electrode high voltage cable 82 of the other one (high voltage side) of the vertically stacked battery modules 9 is connected to a switch side of the SD switch 6. In other words, the two battery modules 9 are connected in series via the SD switch 6, and constitute a high voltage battery (battery with a power supply system in which two battery modules 9 are connected in series) having a nominal voltage of 340 V and a capacity of 5.5 Ah. Note that for the fuse of the SD switch 6, one having a rated current of approximately 125 A can be used for example. With such a structure, high safety can be maintained.

The above-described junction box 18 includes three high voltage relays, which are a negative electrode side main relay $RL_N$ inserted between the negative electrode of the high voltage battery and an inverter motor controller 120, a positive electrode side main relay $RL_P$ inserted between the positive electrode of the high voltage battery and the inverter motor controller 120, and a precharge relay $RL_{PRE}$ connected in parallel with the positive electrode side main relay $RL_P$ via a resistor $R_{PRE}$, and a current sensor $S_I$ such as a hall element inserted between the positive electrode side main relay $RL_P$ and the inverter motor controller 120. Note that an output line of the current sensor $S_I$ is connected to the battery controller 20. For the positive electrode side main relay $RL_P$ and the negative electrode side main relay $RL_N$, one having a rated current of approximately 80 A can be used for example, and for the precharge relay $RL_{PRE}$, one having a rated current of approximately 10 A can be used for example. Also, for the resistor $R_{PRE}$, one having a rated current of approximately 60 W and a resistance value of approximately 50Ω can be used for example, and for the current sensor $S_I$, one having a rated current of approximately ±200 A can be used for example.

Therefore, the above-described negative electrode high voltage cable 82 of the one battery module 9 and the positive electrode high voltage cable 81 of the other battery module 9 (the negative electrode and the positive electrode of the high voltage battery) are connected to the inverter motor controller 120 which drives a motor 130 of the hybrid truck via the high voltage relays and the output plugs 5 (refer to FIG. 1) in the above-described junction box 18. With such a structure, high safety can be maintained.

The inverter motor controller 120 has a power module which produces three-phase alternate current power supply for driving the motor 130 from the power supply of the high voltage battery of 340 V, an MCU, and a smoothing capacitor (electrolytic capacitor or film capacitor may also be used) having a large capacitance of approximately 2000 μF, which is omitted in the drawing. When driving the motor 130, the MCU turns the negative electrode side main relay $RL_N$ from an off state to an on state according to an instruction from the higher controller 110, and thereafter, the MCU turns the positive electrode side main relay $RL_P$ from an off state to an on state, thereby receiving power from the high voltage battery of the power supply system 1. Note that the inverter motor controller 120 makes the motor 130 operate as a generator via a regulator when the hybrid truck is braking, namely, performs regenerative braking control, and regenerates the power generated by the generator operation for the high voltage battery so as to charge the high voltage battery. Also, when the state of charge of the battery module 9 decreases lower than a reference state, the inverter motor controller 120 operates the motor 130 as a generator, and the three-phase alternate current generated in the motor 130 is converted into a direct current by an inverter, supplied to the battery modules 9 as the high voltage battery and charged therein.

Since the internal resistance on the power module side of the inverter motor controller 120 is small, when receiving power from the high voltage battery in an initial state, the negative electrode side main relay $RL_N$ and the positive electrode side main relay $RL_P$ may fuse and get damaged. Accordingly, in the initial state, after turning the negative electrode side main relay $RL_N$ from an off state to an on state, the MCU leaves the positive electrode side main relay $RL_P$ in an off state but turns the precharge relay $RL_{PRE}$ from an off state to an on state to restrict the current via the resistor $R_{PRE}$, and thereby allows charging of the above-described smoothing capacitor in this state. After this smoothing capacitor is charged to a predetermined voltage, the initial state is released. The negative electrode side main relay $RL_N$ and the positive electrode side main relay $RL_P$ are turned to on states, to thereby receive power from the power supply system 1 as described above, without using the precharge relay $RL_{PRE}$ and the resistor $R_{PRE}$. By performing such control, control with high safety becomes possible.

To the connection line between the negative electrode of the high voltage battery of the power supply system 1 and the negative electrode side main relay $RL_N$, and to the connection line between the positive electrode of the high voltage battery and the positive electrode side main relay $RL_P$, capacitors $C_N$, $C_P$ are inserted between the negative and positive electrodes and a case ground (the same potential as the vehicle body of a hybrid truck) respectively. These capacitors are for removing noise generated by the inverter motor controller 120 to prevent malfunctioning in the low voltage circuit. The inverter motor controller 120 has a noise eliminating filter, but the battery controller 20 may malfunction when these capacitors are not present. Thus the capacitors are inserted for increasing reliability of the power supply system 1 against noise. Note that in FIG. 17, the high voltage circuit of the power supply system 1 is shown by bold lines. For these lines, straight angle copper wires having a large cross section are used.

<Low Voltage Circuit of the Power Supply System>

As elements to constitute the low voltage circuit, the power supply system 1 has the battery controller 20, the DC/DC converter included in the converter box 21 and supplying 12 V power to the battery controller 20, the blower fan 17, a relay 94 integrated with the blower fan 17 as a unit for operating the blower fan 17, the above-described cell-con 80 and the current sensor $S_I$.

The DC/DC converter in the converter box 21 receives power from a 24 V lead battery (not shown) as a power supply of a hybrid truck (enables an auxiliary such as a lamp to operate), converts the 24 V voltage to 12 V by a chopper circuit, a smoothing circuit or the like, and supplies a constant voltage of 12 V as operational power supply for the battery controller 20. The DC/DC converter is connected to an on terminal of an ignition switch IGN (refer to the IGN_ON (24 V) line in FIG. 17), starts to operate when the ignition switch IGN is located at an on position to supply power to the battery controller 20 continuously, and stops the power supply to the battery controller 20 when the stop of the power supply is instructed by the battery controller 20 via a shutdown control line. With such a structure, the power supply system with high reliability is realized.

The battery controller 20 has an MPU which performs various types of processing operations as will be described later, a non-volatile EEPROM, an AD converter, a DA converter, and a total voltage detecting circuit for detecting the total voltage of the two battery modules 9 connected in series (high voltage battery).

The total voltage detecting circuit is constituted of an HV+ terminal connected to the positive electrode of the high voltage battery, an alternate current converter connected to an HV− terminal which is connected to the negative electrode of the high voltage battery for converting the total voltage of the high voltage battery to an alternate current, a transformer for insulating the high voltage of the high voltage battery, a dividing resistor which divides the voltage on an output side of the transformer, a direct current converter which converts a voltage divided by the dividing resistor from an alternate current voltage to a direct current voltage, a differential amplifier constituted of an OP amplifier and a resistor for grasping the direct current voltage converted by the direct current converter, and an AD converter which converts an analog voltage outputted from a differential amplifier to a digital voltage, and an output terminal of the AD converter is connected to the MPU. Therefore, the MPU can take in the total voltage of the high voltage battery by a digital value. With such a structure, high precision can be maintained, and the high reliability is maintained.

The battery controller 20 is connected to the on terminal of the ignition switch IGN, and communicates with the higher controller 110 via a communication line 96 included in a main cable 34 (refer to FIG. 17). Also, the output line from the current sensor $S_I$ is connected to the MPU via an AD converter, and the MPU can take in the current flowing in the high voltage battery by a digital value. Also, in the battery controller 20, a DA converter and a transistor are arranged, and the MPU turns the relay 94 to an on state via the DA converter and the transistor to operate the blower fan 17. By such operations, highly reliable control is possible.

Also, the battery controller 20 is connected to the cell-con via the communication harness 50 of the cell-con 80 and is capable of communicating with the cell-con 80, but as described above, the communication harness 50 also includes output lines from temperature sensors TH1 to TH4. These output lines are connected to the MPU via a DA converter.

(Assembly Procedure)

Next, an assembly procedure of the power supply system 1 of this embodiment will be described in phases in an order of the cell pack 19, the cell pack block 40, the battery module 9, and the power supply system 1.

<Assembly Procedure of the Cell Pack 19>

An adhesive is applied to curving portions of the holder 11 which contact the cells 10, the cells 10 are arranged so that the polarities thereof are alternated, and pressure is applied thereto to make snap-fitting between the two holders 11 and the cross-shape louver 37 to be a support post between the holders 11 to function. Next, the metal bus bars insert molded in the holder 11 are spot-welded with the respective cells 10. Note that although final fixing of the cells 10 and the two holders 11 depends on the adhesive, there is adopted a structure in which the physical locking force by the snap-fitting holds enough until the adhesive dries out and solidifies. Accordingly, it is possible to proceed to respective steps of welding, inspecting, and assembling after the adhering step without waiting for passing of a drying time period, and thus the time efficiency increases.

Further, it is adopted a structure such that the voltage detecting lines 58 are gathered on a connector via the not-shown flexible substrate (one end side of the flexible substrate serves as the connector), and the voltage detecting lines are gathered on the connector just by welding the cells 10 to the metal bus bars. The connector is fixed in advance to one of the holders 11 (holder 11 on the right side in FIG. 8). Accordingly, connection of the voltage detecting lines 58 can be simplified significantly.

<Assembly Procedure of the Cell Pack Block 40>

The cell packs 19 produced as above are arranged in parallel as shown in FIG. 4 so that the two block bases 41 face each other, and fixed by tapping screws 42. As shown in FIG. 5, after the cell packs 19 are fixed on the block bases 41, the block reinforcing plates 51 are arranged on upper portions of the cell packs 19, and fixed by tapping screws 42 similarly to the fixing of the block bases 41. At this time, on a face where the voltage detecting lines 58 are arranged, cable ties 55 for attaching the tie bands 54 are attached by tapping screws 42 at four positions. Thereafter, the voltage detecting harness 52 is arranged in the vicinity of the cable ties 55, and fixed by the tie bands 54 to the cell pack block 40. Then, six connecting connectors provided on the other side (opposite side of the harness connector) of the voltage detecting harness 52 are inserted (connected) to the connectors of the six cell packs 19 constituting the cell pack block 40 respectively, thereby completing assembly of the cell pack block 40.

<Assembly Procedure of the Battery Module 9>

As shown in FIG. 3, the cell pack blocks 40 are arranged on and fixed to the lower cover 45. At this time, in the cell pack blocks 40, hooks made of thick wire are inserted in the circular holes of the block reinforcing plate curving portions 56 of the block reinforcing plates 51 for performing handling such as carrying. In the circular holes 47 formed in both ends of the block bases 41 of the cell pack blocks 40, the stud bolts 78 on the introducing side fixing table 62 and the discharging side fixing table 63 constituting the lower cover 45 are passed through and fastened and fixed by nuts including springs. After the two cell pack blocks 40 are arranged in parallel and fixed, it is confirmed that the block flanges B44 projecting from the block bases 41 of the cell pack blocks 40 oppose each other on the block fixing bases 64, and then the block flanges B44 are fastened by nuts including springs.

When fastening of the cell pack blocks 40 is finished, the C/C box 79 including the cell-con 80 is inserted between the cell pack blocks 40 on the discharging side fixing table 63 of the lower cover 45 and the lower cover 45, and the connectors on the tips of the voltage detecting harnesses 52 (two are lead out as shown in FIG. 3) are engaged with the connecting connectors 48, 49 of the cell-con 80 respectively. Thereafter, the C/C box 79 is slid toward and pushed against a side wall of the back face of the lower cover 45, and is fixed by screws from the outside of the battery module 9. There are four fixing points of the C/C box 79, and the C/C box 79 is fixed by lateral fixing from the back face of the lower cover 45 and upper side fixing to welding nut portions provided on the discharging-side fixing table 63. To fasten the connectors with each other, the voltage detecting harnesses 52 side needs allowances for stroke amounts to insert the connectors, but having such allowances makes the harnesses longer than necessary. The required allowances can be minimized by connecting the connectors with each other at the stage that the C/C box 79 is not fixed and hence free, and then sliding the C/C box 79 to the fixing point.

The block connecting bus bars for electrical connection between the cell pack blocks 40 are fastened by attaching screws, and the positive electrode high voltage cable 81 and the negative electrode high voltage cable 82, which have grommets and are fixed, to the lower cover 45 in advance, are connected to the respective cell pack blocks 40 and fastened by screws. Since crimp terminals are connected to ends of these high voltage cables, attaching of them can be performed easily.

After all the electrical connections are finished, the upper cover 46 is placed and the lower cover 45 and the upper cover 46 are fastened by screws. Specifically, the covers are fastened by screws with the stud bolts 88 disposed to stand up on the lower cover flange portions 68 of the lower cover 45 via the circular holes formed in the upper cover flange portions 86 of the upper cover 46. At this time, the block flanges A43 projecting from the block bases 41 are positioned on the lower cover flange portions 68, and fastens the upper cover 46 and the lower cover 45 in the flange portion recesses 87, and also fastens the cell pack blocks 40. Also, the upper cover narrow portions 84 are fastened with the lower cover 45 with screws, and by fastening the upper face of the upper cover 46 and the center poles 66 with screws, assembly of the battery module 9 is completed.

<Assembly Procedure of the Power Supply System 1>

As shown in FIG. 14, the output plugs 5, the cable connectors 4, and so on as well as cables are attached to the lower container 2. The output plugs 5 and the cable connector 4 are arranged on and fixed to one side face along a longitudinal direction, and the SD switch 6 is arranged on and fixed to a position opposing the cable connector 4 on the other side face. Since the SD switch 6 has a cable connected with a predetermined length in advance, attaching of the SD switch 6 is slightly difficult, but workability thereof can be improved by inserting and arranging the cable while bending the cable itself slightly.

Inside an upper portion of the end face on the side where the SD switch 6 is arranged in the longitudinal direction of the lower container 2, two SD terminal bases 33 are fixed and the cable of the SD switch 6 is arranged. The main cable 34 is inserted in the cable connector 4 from the inside of the lower container 2, and the cable is arranged on a wall side so as not to be an obstruction when inserting the battery modules 9. Note that as shown in FIG. 17, the main cable 34 is constituted of an input line to the DC/DC converter (24 V, GND), an IGN_ON (24 V) line, the communication line 96, and input lines to the negative electrode side main relay $RL_N$, the positive electrode side main relay $RL_P$, and the precharge relay $RL_{PRE}$. Next, the high voltage cables 35 are connected to the two output plugs 5, respectively. At this time, since connection portions of the output plugs 5 are M6 screws, the high voltage cables 35 are fixed and fastened by screws. Note that in FIG. 14, for simplicity of explanation, protection tubes for the respective cables are omitted, but it is preferable that the cables are protected by corrugated tubes or the like. Further, the output plugs 5 are arranged on the lower portion (near the bottom face) of the lower container 2, where there are concerns of dew concentration and entrance of water, and hence it is preferable that the connecting parts of the cables and the terminals are shielded by insulative tubes, or an insulative material is coated thereon to increase safety.

Next, as shown in FIG. 16, the battery modules 9 are inserted in the lower container 2 to which the cables are fixed. At this time, the ventilation duct 16 is attached to the module case 9a. Originally, in each battery module 9, the intake 14 and the exhaust port 15 are formed at symmetrical positions so that the battery module 9 can be used independently, but for minimizing a space in which the duct for discharging cooling air is drawn in the external box 1a, there is adopted a structure to pull the cooling air discharged from the battery modules 9 upward through the ventilation duct 16.

The battery modules 9 may be inserted by hanging them with a rope or the like, but the most efficient manner is to use a suction pad, which allows lifting with a suction cup. The two battery modules 9 are inserted to be stacked vertically. At this time, seal cushions 28 are arranged between a lower end of the ventilation duct 16 of the battery module 9 positioned on the lower side and the inner bottom face of the lower container 2 and between the ventilation ducts 16 attached to the two battery modules 9, respectively. The first-level battery module 9 is fastened by screws and the second-level battery module 9 is fixed using the collars 91, the long bolts 92 (refer to FIG. 12). Thereafter, the blower duct case 22 and the JB duct case 23 are arranged above the battery modules 9 and the case fixing cross bars 29 and the fixing bars are fastened by screws. A seal cushion 28 is also arranged between an upper end of the ventilation duct 16 and the opening of the blower duct case 22. The intermediate duct 24 is arranged and fixed between the discharge port 17b of the blower fan 17 and an opening formed in one side (blower fan 17 side) in the upper face of the JB duct case 23. At this time, rubber sponges may be used as seal materials for contact faces between the intermediate duct 24 and the blower fan 17 and the JB duct case 23, but since there are concerns of uncertainties such as deterioration or crack of the rubber due to movement of high-temperature air, it is effective to use a liquid gasket. The respective high voltage cables 35 are connected to the battery modules 9, and the output terminals of the battery modules 9 and the SD switch 6 are connected.

Next, the discharge duct 25 is inserted and fixed in the lower container 2. An opening of the upper portion of the discharge duct 25 is coupled to an opening formed on the other side (opposite side of the blower fan 17) on the upper face of the JB duct case 23. It is desirable to use a liquid gasket as a seal material also at a connecting face between the JB duct case 23 and the discharge duct 25, similarly to the intermediate duct 24. Similarly, with the liquid gasket, an opening on a lower portion of the discharge duct 25 is coupled to the release port 26 formed in the bottom face of the external box 1a. The flanges 32 of the upper cover 3 and the lower container 2 are overlapped with each other with the liquid gasket being applied on connecting faces thereof and fixed by fastening with screws, thereby completing assembly of the power supply system 1.

(Operation)

Next, with reference to FIG. 11 and FIG. 17, the operation of the power supply system 1 of this embodiment will be explained with the ICs of the cell-con 80, the MPU of the battery controller 20 and the higher controller 110 being main objects.

<Startup and the Like>

When the ignition switch IGN is positioned at an on position, the DC/DC converter in the converter box 21 receives power from the 24 V lead battery, converts the 24 V voltage into a 12 V voltage, and supplies 12 V power to the battery controller 20. Accordingly, the MPU of the battery controller 20 executes initial setting processing according to a program which is expanded in a RAM, and when the MPU recognizes that the ignition switch IGN is positioned at the on position, the MPU starts the IC-1 to IC-12 of the cell-con 80 which are in a sleep state. Specifically, the MPU transmits a startup signal to the signal input terminal In-1 of the IC-1 via the photo coupler F1.

The input circuit of the IC-1 converts the potential of the signal transmitted to the signal input terminal In-1, and transmits the signal to the reference power supply circuit. Accordingly, the reference power supply circuit starts up, and the reference power supply circuit charges the capacitor CV1 externally attached to the IC-1 via a transistor which is omitted in the drawings. When the voltage of the capacitor CV1 becomes equal to or larger than a specified value which is slightly smaller than the voltage VDD, a logic circuit starts up. Thereafter, the voltage of the capacitor CV1 is controlled to be the constant value VDD. The logic circuit recognizes the startup signal transmitted from the MPU, and transmits the signal to the following IC-2 on the lower potential side via an output circuit. Similarly, thereafter, IC-2 to IC-12 starts up. Furthermore, the IC-12 returns the startup signal to the MPU via the photo coupler F4.

The MPU recognizes by the returned signal that all the IC-1 to IC-12 started up from the sleep state, reports to the higher controller 110 via the communication line 96 that the startup is completed, and thereafter proceeds to the next instruction. Specifically, the MPU sends a control instruction in a serial format to the IC-1 to IC-12 using the photo couplers F1 to F3. Such control instructions include, as will be described later, a voltage detecting instruction for each cell and a capacity adjusting instruction.

The IC-1 converts the potential of a serial signal obtained by the signal input terminals In-1 to In-3 in the input circuit, and decrypts it in the logic circuit. Then, the signal is stored once in a register, and the same serial signal is sent to the IC-2 via the output circuit. The lower order IC-2 to IC-12 executes similar operations. Then, the lowest-order IC-12 returns the serial signal to the MPU via the photo couplers F4 to F6.

The MPU confirms the returned serial signal, and if it is normal, sends a next control instruction. The MPU integrates the number of errors related to a signal voltage, and when the number is lower than a tolerable number, sends the same instruction signal to the IC-1 for doing the process over. On the other hand, when the number of errors reaches a tolerable range or above, the MPU judges this as abnormality and outputs an abnormality signal to the higher controller 110.

The IC-1 to IC-12 of the cell-con 80 are connected in a chain form in an electrically non-insulated state by the signal output terminals Out-1 to Out-3 and the signal input terminals In-1 to In-3, and since a control instruction is transmitted via a serial signal, there is a time delay until an instruction reaches the IC-1 to the IC-12, but a voltage variation in the cells 10 during this period is quite small, and hence no problem occurs in practice. On the other hand, even when an error occurs in any one of the ICs, the MPU can detect this error by comparing the control instruction transmitted to the IC-1 with the control instruction returned from the IC-12. Particularly, in the power supply system 1 of this embodiment sending a signal in a non-insulated state and including the DC/DC converter, it is necessary to consider the influence of noise generated by the DC/DC converter. The MPU can confirm that every instruction is recognized precisely in all the IC-1 to IC-12, and thus the reliability of the system can be improved. Specifically, with the above-described starting method, control with high reliability becomes possible. Also, an abnormal state can be confirmed, and hence control with high safety can be realized.

<Voltage Detection>

When the power supply system 1 is in a charge/discharge stop state, the MPU transmits a voltage detecting instruction to the IC-1 to IC-12 via the photo couplers F1 to F3. The MPU can determine whether the power supply system 1 is in any one of a charged state, discharged state, and a halt state by monitoring the output from the current sensor $S_I$. When the hybrid truck is running, charging/discharging are performed between the high voltage battery and the inverter motor controller, and hence the voltage detecting instruction is performed when the hybrid truck is in the charge/discharge stop state. Also, in the case of a lithium secondary cell in which amorphous carbon is used as a negative electrode active material in cells, correlation between an open circuit voltage of a cell and a state of charge (SOC) or capacity thereof is quite high. By sending the voltage detecting instruction while in the charge/discharge stop state, a cell state such as SOC of each cell can be grasped accurately.

The MPU and the IC-1 to IC-12 execute the above-described operation at the startup time, and the MPU reports that the startup is completed to the higher controller 110 via the communication line 96. Upon reception of this report, the higher controller 110 issues the voltage detecting instruction to the MPU.

The MPU issues the voltage detecting instruction for a cell B1 to the IC-1. The IC-1 stores the instruction in a register, and by sending the same instruction to the lower order IC, the instruction is returned to the MPU. This method is similar to the above-described method. The logic circuit of the IC-1 decrypts this voltage detecting instruction, and specifies the cell B1 as the voltage detecting target to the multiplexer and obtains a digital voltage value of the cell as the voltage detecting target by the AD converter. At this time, the AD converter performs error correction as described above. Next, by transmitting the obtained digital voltage value of the cell B1 as the voltage detecting target to the lower order IC, the MPU obtains a digital voltage value of the cell B1. Thereafter, the MPU sequentially repeats the voltage detecting instruction for the cell similarly to obtain digital voltage values of the cells B1 to B48. Thus, detection of a voltage with high reliability can be performed, and the SOC of a cell can be grasped with high accuracy.

The MPU confirms whether the signal returned from the IC-12 has an error or not (if so, sends the same instruction again). Thereafter, the MPU takes in temperature values of cells B1, B5, B41, B45 detected by the temperature sensors TH1 to TH4 via the AD converter, and calculates an arithmetic mean value of the taken temperature values. Next, the MPU calculates SOCs of the obtained respective cells B1 to B48.

<Normal Operation>

At every predetermined time, the MPU reports to the higher controller 110 via the communication line 96 the SOC (state of charge) of all the cells B1 to B48 constituting the power supply system 1, a dischargeable output capacity, a chargeable output capacity, a mean temperature of the cells, the total voltage of the high voltage battery, a charge current, a discharge current, and so on.

Specifically, the MPU calculates the SOC of the cells B1 to B48 after startup, and begins integration of charge currents and discharge currents respectively, which are detected by the current sensor $S_I$. Also, the MPU takes in the voltage of the high voltage battery from the above-described total voltage circuit. Further, the MPU calculates the arithmetic mean value of the cell temperatures detected by the temperature sensors TH1 to TH4. Then, using the taken voltage of the high voltage battery, the integrated value of charge currents, the integrated value of discharge currents and the mean temperature of the cells, the MPU calculates the SOC of the cells B1 to B48, and also calculates a current dischargeable output capacity and chargeable output capacity. Note that the MPU turns the relay 94 to an on state to make the blower fan 17 operate for cooling all the cells constituting the high voltage battery at the time of startup. By this method, the reliability of control improves, and also cooling with higher reliability becomes possible.

<Capacity Adjustment>

As described above, the MPU grasps the SOC of all the cells B1 to B48 constituting the power supply system 1 at the time of startup. When there is dispersion of a specified value or larger in SOC of all the cells B1 to B48, an adjusted capacity for a cell (the cell as a capacity adjustment target) that exceeds a specified value is calculated so that the range of dispersion is in the range of the specified value, and a capacity adjustment time corresponding to the calculated adjustment capacity is calculated. Since resistance values of the resistors R1 to R48 are known, the capacity adjustment time can be easily calculated with reference to a table. When the power supply system 1 is in a charge/discharge state, the MPU sends a capacity adjustment instruction for the cell as a capacity adjustment target to the IC-1 to IC-12 via the photo couplers F1 to F3. To this instruction, a cell number (for example, B1) as a capacity adjustment target and information regarding the capacity adjustment time are added.

Such capacity adjustment is for preventing that a desired function as the battery module or the entire high voltage battery is not exhibited when there occurs dispersion in SOC of cells because a cell in which dispersion occurred becomes a load on other cells, and also for that it is necessary to assure a desired lifetime as the battery module or the entire high voltage battery, as a cell in which dispersion occurred tends to have a lifetime shorter than a designed lifetime. Therefore, it is preferable to perform control on the battery controller 20 side so that the dispersion in SOC of all the cells is in the range of the specified value.

In the charge/discharge state, a hybrid truck is in motion and thus the high voltage battery is charged/discharged. In a charged state, a part of the charge current is heat-consumed in the resistors of the capacity adjusting circuits and the charge current value of a cell having a high voltage (in which dispersion occurred) becomes small. In a discharged state, similarly, the discharge current is heat-consumed in the resistors of the capacity adjusting circuits and the discharge current value of a cell having a high voltage becomes large. As a result, the voltage of a cell having a high voltage gets close to the voltages of other cells. There is an effect that charge/discharge states of the cells becomes even.

Upon reception of the capacity adjusting instruction from the MPU, each IC stores the instruction in a register, and by sending the same instruction to a lower order IC, the instruction is returned to the MPU. This method is the same as the above-described one. The logic circuit of each IC decrypts this capacity adjusting instruction, judges whether a cell under the control of the logic circuit is a capacity adjustment target cell or not from a cell number. When negation is judged, the logic circuit takes it as an instruction issued for another IC and does not respond, but when affirmation is judged, the logic circuit executes capacity adjustment of the capacity adjustment target cell during an instructed capacity adjustment time. Specifically, for example when the cell B2 is the capacity adjustment target cell, a high-level signal is outputted to the terminal T4 during the instructed capacity adjustment time. The MPU similarly instructs the IC-1 to IC-12 regarding other cells which need capacity adjustment to allow the IC-1 to IC-12 to eliminate dispersion in SOC between the cells B1 to B48. After completing capacity adjustment of cells under their own control, the IC-1 to IC-12 transmits the completion to the lower order IC, and thereby the MPU can recognize that the capacity adjustment of all the capacity adjustment target cells is completed.

(Effects and So On)

Although there are parts overlapping with the above explanation since the characteristics and effects which the power supply system 1 of this embodiment has are described in the above explanation, effects and so on will be explained again.

The battery modules 9 constituting the power supply system 1 of this embodiment each include the cell-con 80 in the C/C box 79. In the cell-con 80, the 12 IC-1 to IC-12 of the same types are mounted on the substrate, and these ICs are mounted two by two on the rectangular longer sides of the rectangular continuous straight line L-L' defined on the substrate from the IC-1 on the highest potential side to the IC-12 on the lowest potential side continuously in order of potential differences of the corresponding cell packs AB1 to AB12 (refer to FIG. 10). Also, the distances between rectangular shorter sides of the rectangular continuous straight line L-L' are the same in this embodiment. Accordingly, the ICs can be mounted compactly on the substrate while giving freedom in design of the cell-con 80 according to the number of cells 10 constituting the battery modules 9, and the mounting area can be made small. Thus, the cell-con 80 can be reduced in costs.

At the time when the present application is applied, making as IC of a cell-con of this type on the commercial basis is not realized, and the substrate area of the same type of cell-con and the costs thereof are approximately eight times of those of the this embodiment. Therefore, it can be considered that an industrial utility value of the cell-con 80 is very high.

Also, in the cell-con 80, between the IC-1 to IC-12 having different grounds (voltages) GND-1 to GND-12, the signal output terminal Out-1 to the signal output terminal Out-3 are connected respectively to the signal input terminals In-1 to In-3 of a lower order IC in an electrically insulated state, and serial communication is performed in a chain structure. Therefore, circuit elements for communication compensating potential differences between the IC-1 to IC-12 are not necessary, and the cell-con 80 can be constructed quite compactly.

Further, in the cell-con 80, the resistors R1 to R48 constituting the capacity adjusting circuits are mounted in a divided manner at two regions (dashed-line regions near the connecting connectors 48, 49 in FIG. 10) separated from the rectangular continuous straight line L-L'. Accordingly, the influence to the IC-1 to IC-12 of heat generated by the resistors R1 to R48 during capacity adjustment can be minimized.

Also, in the cell-con 80, the photo couplers F1 to F6 for performing communication in an insulated state with the MPU of the battery controller 20 are divided in two and mounted together with the resistors RF1 to RF6, the transistors Tr1 to Tr3 (the chain double-dashed line regions near the connecting connectors 48, 49 in FIG. 10). In conventional configurations, when there are 12 cell packs 19, each IC requires two photo couplers for input/output, and thus 24 photo couplers are needed in total. Since six photo couplers are sufficient in this embodiment, the substrate area of the cell-con 80 is reduced and costs can be reduced.

Also, the cell-con 80 relays the led-out lines from the temperature sensors TH1 to TH4 to the battery controller 20. These led-out lines are gathered integrally on the connector to which the voltage detecting lines 58 of the cell packs 19 are gathered. Therefore, at the time of assembly, connections are completed just by inserting the six connecting connectors provided on the other side of the voltage detecting harness 52 in the connectors of the cell pack, connecting the harness connector on one side of the voltage detecting harness 52 to the connecting connectors 48, 49 of the cell-con 80, and connecting the connector on the tip of the communication harness 50 to the connecting connector of the battery controller 20. Therefore, connection of these led-out lines can be performed integrally with connection of the voltage detecting lines, and thereby the labor of connection can be saved. Also, since these led-out lines are integrated with the voltage detecting harness 52 and the communication harness 50, there is no fear of disconnection in a hybrid truck which generates vibration. Further, in this embodiment, since temperature detections are not performed on the cell-con 80 side but performed on the battery controller 20 side, it is not needed to mount AD converters on the ICs. Accordingly, the ICs can be suppressed to be small, and hence the substrate area of the cell-con 80 can be made small.

Also, since the IC-1 to IC-12 of the cell-con 80 are supplied with operational power from the corresponding cell packs AB1 to AB12, wirings from an external power supply to the cell-con 80 can be eliminated as compared to the case of using the external power supply, and also the number of printed circuits on the substrate can be reduced.

Therefore, in the battery module 9, since the cell-con 80 can be made small, the battery modules 9 can be reduced in size, and cooling spaces (passage for cooling air) for cooling the respective cells needed in the battery modules 9 can be assured sufficiently, thereby leading to reduction in size of the power supply system 1. In other words, the original performance of the battery can be drawn out, and a volume capacity density thereof can be increased.

Also, in the battery modules 9 constituting the power supply system 1 of this embodiment, lithium secondary cells are used for the cells 10. Accordingly, a volume capacity density higher than that of the nickel hydride secondary cell can be assured for example. Further, since amorphous carbon is used as the negative electrode active material, the state of charge (SOC) of the cells 10 can be grasped with high accuracy by measuring the open circuit voltage (OCV) as described above. Moreover, since lithium manganese complex oxide is used as the positive electrode active material, a low-cost cell can be made as compared to the case that lithium cobalt complex oxide is used for the positive electrode active material because the material is abundant. Thus, costs for the battery module 9 as well as the power supply system 1 can be reduced.

Further, in the power supply system 1 of this embodiment, the MPU of the battery controller 20 performs communication in an electrically non-insulated state with the ICs of the cell-con 80 via the photo couplers F1 to E6, and also the total voltage circuit of the battery controller 20 is insulated from the high voltage of the high voltage battery by a transformer. Accordingly, there is no fear of causing voltage destruction, and propagation to the higher controller 110 side by short-circuit or the like can be prevented.

Also, in the power supply system 1 of this embodiment, two battery modules 9 are connected in series via the SD switch 6 for maintenance/inspection. Therefore, during maintenance/inspection, safety for a worker can be assured by turning the SD switch 6 to an off state to work thereon. Also, since the SD switch 6 is exposed on the module case 9a (refer to FIG. 14), the switch can be turned to an off state in the initial stage of maintenance/inspection before separating the lower container 2 and the upper cover 3.

Also, in the power supply system 1 of this embodiment, the battery controller 20 receives power via the DC/DC converter from the 24 V lead battery which is an external power supply. Therefore, as compared to the case of receiving power from a high voltage battery constituted of two battery modules 9, the self-maintaining ability of battery functions can be increased. Moreover, since the power supply system 1 includes the DC/DC converter, the power supply system 1 can be mounted in various types of mobile bodies. Note that in our country, 24 V lead batteries are adopted as power supply in many trucks.

Further, the power supply system 1 of this embodiment has the DC/DC converter, but the positive and negative electrodes of the high voltage battery have capacitors $C_N$, $C_P$ intervening respectively between the poles and the case ground. This ground has the same potential as the minus side of the 12 V battery converted by the DC/DC converter (also the same potential as that of the vehicle body of the hybrid truck). Thus, the power supply system can be made reliable in terms of noise resistance with respect to the inverter motor controller 120 which receives power.

Also, the power supply system 1 of this embodiment has the positive electrode side main relay $RL_P$ and the negative electrode side main relay $RL_N$ inside the junction box 18. Therefore, safety for the entire external apparatus can be increased in case that some external forces act on the power supply system 1 to break part of the power supply system 1. Further, these high voltage relays are controlled on and off from the inverter motor controller 120 which receives power from the power supply system 1. Thus, supplying of power can be performed safely and immediately when it is needed, thereby enabling original functions as a power supply system.

Also, in the junction box 18, the precharge relay $RL_{PRE}$ having a small current resistance value than the positive electrode side main relay $RL_P$ is connected to the positive electrode side main relay $RL_P$ in parallel via the resistor $R_{PRE}$, and at an initial time when the battery module 9 supplies power to the inverter motor controller 120, the precharge relay $RL_{PRE}$ is controlled by the inverter motor controller 120 to an on state to thereby charge the smoothing capacitor in the inverter motor controller 120. Thus, it is possible to prevent an accident of fusing the positive electrode side main relay $RL_P$ and the negative electrode side main relay $RL_N$ even when the resistance on the input side of the inverter motor controller 120 is small.

Moreover, in the power supply system 1 in this embodiment, the external case of the battery module 9 is made in a substantially hexahedron with the lower cover 45 having three faces of a front face, a bottom face, and a back face, the upper cover 46 having a left side face, a top face, and a right side face, and the lower cover 45 and the upper cover 46 being coupled. Accordingly, since spaces of the left side face and the right side face are open, workability (assembly performance) can be improved when two cell pack blocks 40 each constituted of six cell packs 19 are arranged on and fixed to the lower cover 45. Safety can be improved also when the lower cover 45 and the upper cover 46 are coupled, visual confirmation from the front face and the back face direction can be done. Also, both the upper cover 46 and the lower cover 45 have three faces, costs can be reduced more than by the external case of a box structure having five faces.

Also, the power supply system 1 of this embodiment can be assembled step by step: the cells 10→the cell packs 19→(cell pack blocks 40)→the battery modules 9→the power supply system 1. Therefore, management of assembly units is easy. Also, since most of connections of the low voltage circuit are done with connectors, the connections are easy and miss wiring can be prevented, and also disconnection due to vibration or the like can be prevented when being mounted in a hybrid truck.

Further, the power supply system 1 of this embodiment has the tip of the horizontal pipe of the ventilation duct 16 coupled to the exhaust port 15 of the battery module 9, and the upper end of the vertical pipe of the ventilation duct 16 coupled to the opening formed in the lower face of the blower duct case 22. The opening formed in the upper face of the blower duct case 22 is coupled to the inlet 17a of the blower fan 17. The tip of the horizontal pipe of the discharge duct 25 is coupled to the discharge port 17b of the blower fan 17, and the lower end of the horizontal pipe of the discharge duct 25 is coupled to the release port 26 of the external box 1a. Accordingly, the ventilation duct 16, the blower duct case 22 and the blower fan 17 are in communication and the blower fan 17 and the discharge duct 25 are in communication, and hence an exhaust path can be formed while assuring cooling performance.

Moreover, in the power supply system 1 of this embodiment, the ventilation duct 16 is attached closely to the end face of the module case 9a in which the exhaust port 15 is formed. The ventilation duct 16 has a length in a direction along the end face of the module case 9a set to almost the same as the height of the module case 9a, and the horizontal pipe coupled to the exhaust port 15. Accordingly, a structure is made in which the ventilation ducts 16 (horizontal pipes) attached to the respective module cases 9a are coupled with each other by arranging the two battery modules 9 in a vertically stacking manner. Specifically, when the battery modules 9 are accommodated in the external box 1a, the ventilation ducts 16 are stacked to be extended by just stacking the battery modules 9. Accordingly, a part of the exhaust path which allows communication of the battery modules 9, and the ventilation ducts 16 can be formed easily. An accommodating and fixing operation of the battery modules 9 in the external box 1a becomes easy, and workability can be improved.

Further, in the power supply system 1 of this embodiment, the blower duct case 22 having a flat shape and a slit-shape opening formed in the cross-section in the width direction is arranged above the battery modules 9. On the upper face of the blower duct case 22, the blower fan 17 is arranged, and the inlet 17a of the blower fan 17 is coupled to the opening formed in the upper face of the blower duct case 22. Accordingly, by arranging the blower duct case 22 coupled to the blower fan 17 on the upper side of the battery modules 9 accommodated in the external case 1a, the upper end of the ventilation duct 16 and the opening formed in the lower face of the blower duct case 22 can be coupled easily. Also, the discharge port 17b of the blower fan 17 is coupled to the tip of the horizontal pipe of the discharge duct 25 via the intermediate duct 24 and the JB duct case 23, and the lower end of the vertical pipe of the discharge duct 25 is coupled to the release port 26. Accordingly, by just accommodating the battery modules 9, the blower duct case 22, the intermediate duct 24, the JB duct case 23, and the discharge duct 25 in order in the external box 1a, the entire discharge path is formed easily. Thus, the accommodating operation and the fixing operation inside the external box 1a can be simplified, and the workability can be improved significantly.

Moreover, the power supply system 1 of this embodiment, the ventilation duct 16 is attached along the end face of the module case 9a in which the exhaust port 15 is formed, and the discharge duct 25 is arranged along the side of the end face in which the intake 14 is formed. Accordingly, the ventilation duct 16 and the discharge duct 25 run along the both end faces in the longitudinal direction sandwiching the battery modules 9. Thus, the exhaust path in the external box 1a can be formed compactly, and the entire power supply system 1 can be reduced in size. Also, the discharge duct 25 is arranged on the side of the end face on which the output terminals of the battery modules 9 project. Therefore, the space formed between the projecting output terminals can be used effectively, and thereby formation of a wasted space is prevented to realize reduction in size.

Also, in the battery module 9, the lower cover 45 forms the ducts 75 for the respective arranged cell packs 19, and the ventilation holes 76 are formed in the ducts 75 at positions corresponding to the spaces between the cells 10 constituting the cell packs 19. Thus, a structure is made in which cooling air blow upward from the lower side between the respective cells 10, and since the cooling air flowing through the ducts 75 has a constant temperature, the air having the constant temperature is blown to the respective cells 10, resulting in an almost constant cooling condition. Also, it becomes a very efficient structure in which the cooling system is completed by just forming the cell pack blocks 40, in which the cell packs 19 having the same shapes and the louver functions (arch-shape louver 36, cross-shape louver 37) inside are fixed, on the lower cover 45 having the ducts 75 and the ventilation holes 76. The louver shape does not need to be changed for each of the cells 10, and thereby simple assembly becomes possible. Further, the opening areas of the ventilation holes 76 are large on the introducing side of the cooling air and become small with distance toward the discharging side. The ventilation holes which are closest to the introducing side are covered by the blocking louvers 77, and the ventilation holes which are closest to the discharging side have substantially the same opening areas as the ventilation holes which are closest to the introducing side. Accordingly, temperatures of the cells 10 can be almost constant.

Then, in the battery modules 9, the lower cover 45 has the lower cover projections 73 on the bottom face (refer to FIG. 7), and the upper cover recesses 89 are formed in the upper cover 46. Thus, it becomes possible to arrange the battery modules 9 in a stacking manner by engaging the lower cover projections 73 with the upper cover recesses 89. Accordingly, the power supply system 1 of this embodiment allows three-dimensional arrangement as compared to a planar arrangement of the battery module 9, thereby improving the spatial use ratio. Here, since the structure of fixing with the collars 91 and the long bolts 92, influences of vibration or the like can be eliminated even when being mounted in a mobile body such as a hybrid truck.

Figure 18:
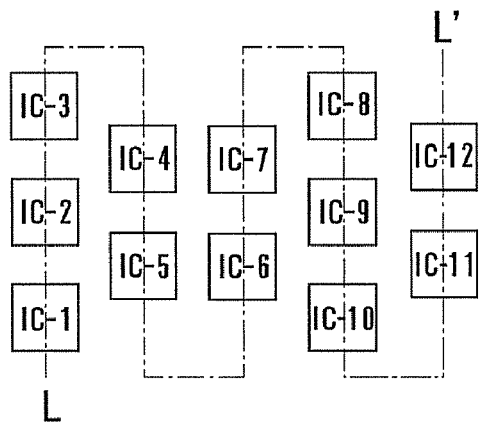
FIG. 18 is another embodiment of a case of mounting the ICs on the substrate of the cell-con.
Figure 19:
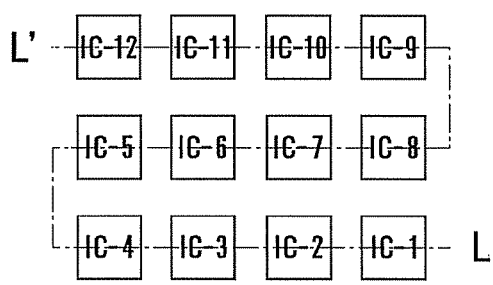
FIG. 19 is still another embodiment of a case of mounting the ICs on the substrate of the cell-con.

Note that in this embodiment, as shown in FIG. 10, an example is shown in which, on the substrate of the cell-con 80, the ICs are mounted two by two on the rectangular longer sides of the rectangular continuous straight line L-L' from the IC-1 on the highest potential side to the IC-12 on the lowest potential side continuously in order of potential differences of the corresponding cell packs AB1 to AB12, but the present invention is not limited to this. For example, as shown in FIG. 18, the number of ICs mounted on the rectangular longer sides of the rectangular continuous straight line L-L' may be different. Such a case is effective when connectors, circular holes for fixing a substrate, and so on must be arranged above the IC-4, IC-7 or below the IC-5, IC-6, and also in such a case, the distances between the rectangular shorter sides of the rectangular continuous straight line L-L' may be changed, which assures freedom in design. Further, as shown in FIG. 19, there is no restriction in the direction of rectangular continuous straight line L-L', and the ICs may be mounted sequentially from the lowest potential side to the highest potential side, to the contrary of the substrate of the cell-con 80 of this embodiment.

Figure 20:
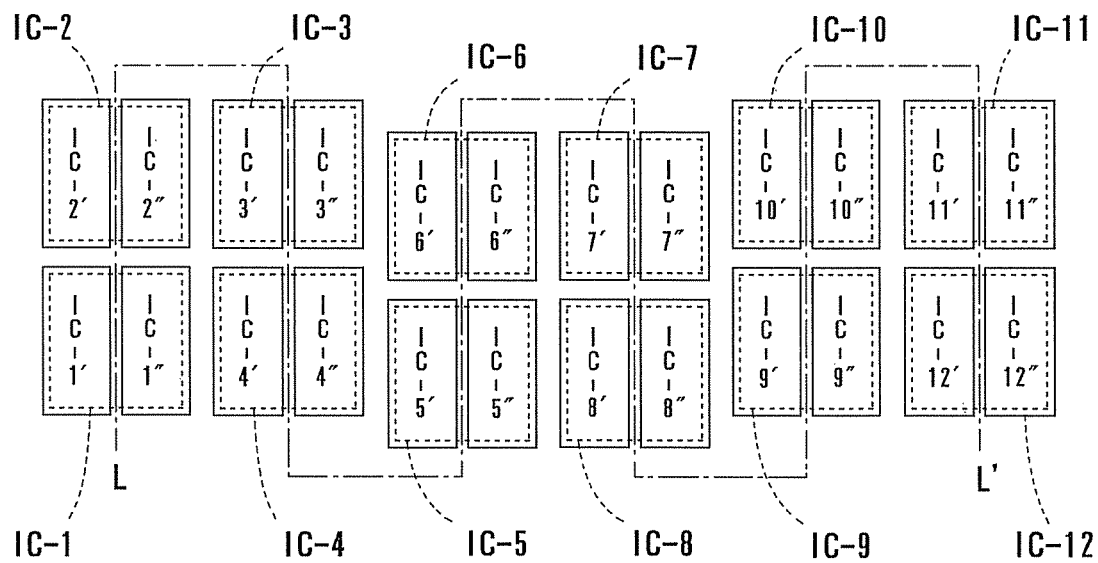
FIG. 20 is yet another embodiment of a case of mounting the ICs on the substrate of the cell-con.

Also, in this embodiment, a mounting example is shown in which one IC corresponds to one cell pack on the substrate of the cell-con 80. However, when ignoring the processing speed of the IC itself, small increase in size due to packaging, and the like, it is known that, for example, changing of an 8-bit CPU to two 4-bit CPUs is advantageous in terms of costs. Also, in the example shown in this embodiment, since the analog part and the digital part are accommodated in one IC package, it is possible to divide in an analog part and a digital part, in other words, make a plurality of ICs correspond to one cell pack for example. FIG. 20 is an example in which two ICs are made to correspond to one cell pack. Therefore, the case of making a plurality of ICs correspond to one cell pack is also within the technical scope of the present invention or within the range of equivalency thereof.

Also, in this embodiment, since the hybrid truck has the 24 V lead battery mounted therein, the power supply system 1 having the DC/DC converter converting 24 V to 12 V is presented an example, but trucks having a 12 V led battery mounted therein are also in widespread use in the United States for example. In such a case, the DC/DC converter is not necessary, and the power supply system 1 can be reduced in size.

Further, in this embodiment, an example is shown in which the battery controller 20 calculates the SOC of each cell 10 to perform capacity adjustment, but the cells under control of each IC may be separately adjusted in capacity by increasing the accuracy of the reference voltage of the reference power supply circuit of each IC of the cell-con 80. Moreover, in this embodiment, an example is shown in which the switch elements of the capacity adjusting circuits are mounted in the ICs, but these switch elements may be mounted on the substrate outside the ICs, similarly to the resistors of the capacity adjusting circuits.

Further, in this embodiment, an example is shown in which the temperature sensors TH1 to TH4 are fixed to the cells on the highest potential side of the cell packs AB1, AB2, AB11, AB12, but since it is sufficient if the mean temperature for all the cells constituting the high voltage battery can be grasped, the present invention is not limited to the exemplified form. For example, the temperature sensors may be fixed to any cells of any two of the cell packs.

Further, in this embodiment, the power supply system 1 for a hybrid truck is shown as an example, but the present invention is not limited to this but can be applied widely to power supply systems requiring a high current charging and discharging. Also, in this embodiment, an example of the battery modules 9 is shown in which 12 cell packs 19 are arranged in parallel in each of which four cells 10 are connected in series, but the present invention is not limited to the structure and the connections (serial, parallel) of the battery modules 9. For example, the number of cells 10 may be changed, and the number or the arrangement of the cell packs 19 may be changed. Further, in this embodiment, an example is shown in which the two battery modules 9 are stacked vertically and accommodated in the external box 1*a*, but three or more cell packs may be accommodated, and of course, it may be a power supply system using one battery module 9.

Further, in this embodiment, cylindrical lithium secondary cells are shown as the cells 10 for example, but the present invention is not limited to this. For example, the cells 10 may have a prismatic, polygonal shape, and a secondary cell covered by a laminate film may be used. Also, other than the lithium secondary cell, another secondary cell such as a nickel hydride secondary cell may be used.

Then, in this embodiment, an example is shown in which the intake 14 and the exhaust port 15 of a battery module 9 are formed in the lower parts of the end faces on the both sides in the longitudinal direction respectively, but the present invention is not limited to this. For example, when the intake 14 is formed in an upper part of an end face of the battery module 9, the flow of cooling air is in a diagonal direction when viewed from a side face along the longitudinal direction of the battery module 9, which can increase the cooling effect. Further, the intake 14 may be formed in a side face along the longitudinal direction.

INDUSTRIAL AVAILABILITY

The present invention provides a cell controller which has excellent productivity, a battery module having the cell controller, and a power supply system including the battery module, and hence contributes to the manufacturing and sales of the cell controller, the battery module, and the power supply system. Thus, the present invention has industrial availability.

What is claimed is:

1. A cell controller for a battery unit in which a plurality of cells are connected in series,
    wherein ICs for detecting voltages of respective cells constituting said battery unit are mounted on a substrate corresponding to the number of cell groups, and said ICs are mounted plurality by plurality on rectangular longer sides of a rectangular continuous straight line defined on said substrate from an IC on a highest potential side to an IC on a lowest potential side or from an IC on a lowest potential side to an IC on a highest potential side continuously in order of potential differences of said corresponding cell groups.

2. The cell controller according to claim 1, wherein the number of ICs mounted on the rectangular longer sides of the rectangular continuous straight line is the same in each of the rectangular longer sides.

3. The cell controller according to claim 1, wherein distances between the rectangular shorter sides of the rectangular continuous straight line are the same.

4. The cell controller according to claim 1, wherein between each of said ICs and a lower order IC thereof, terminals related to input and output of a signal are connected in an electrically non-insulated state.

5. The cell controller according to claim 1, wherein capacity adjusting circuits each constituted of a resistor element and a switch element for adjusting capacities of said respective cells constituting said battery unit are mounted on said substrate, and the resistor elements are mounted collectively in a region separated in distance from the rectangular continuous straight line.

6. The cell controller according to claim 1, wherein photo couplers are further mounted on said substrate for performing signal communication in an electrically insulated state between input terminals of said IC on the highest potential side and output terminals of said IC on the lowest potential side and a higher order battery controller controlling the cell controller.

7. The cell controller according to claim 1, wherein on at least one of said cell groups, a temperature sensor is arranged for detecting a temperature of one of said cells constituting said cell groups, and said substrate relays led-out lines lead out from the temperature sensor to the higher order battery controller controlling the cell controller.

8. The cell controller according to claim 1, wherein said ICs are supplied with operational power from said corresponding cell groups.

* * * * *